(12) United States Patent
Hirose et al.

(10) Patent No.: US 7,167,795 B2
(45) Date of Patent: Jan. 23, 2007

(54) DEVICE, SYSTEM, METHOD AND PROGRAM FOR NAVIGATION AND RECORDING MEDIUM STORING THE PROGRAM

(75) Inventors: Koji Hirose, Tokyo (JP); Nobuaki Suzuki, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 345 days.

(21) Appl. No.: 10/710,448

(22) Filed: Jul. 12, 2004

(65) Prior Publication Data

US 2005/0027447 A1    Feb. 3, 2005

(30) Foreign Application Priority Data

Jul. 30, 2003    (JP) .............................. 2003-204051

(51) Int. Cl.
    *G01C 21/34*    (2006.01)
(52) U.S. Cl. ...................... 701/210; 701/117; 701/209; 701/213; 340/988; 340/995.21; 342/357.06
(58) Field of Classification Search ........ 701/200–202, 701/117–119, 209–211, 23–26, 213–215; 340/988–993, 995.1; 342/357.06, 357.09, 342/357.12, 357.13
    See application file for complete search history.

(56) References Cited

U.S. PATENT DOCUMENTS 6,334,087 B1 * 12/2001 Nakano et al. ............. 701/208
6,581,004 B1 * 6/2003 Mori et al. ................. 701/209
6,591,188 B1 * 7/2003 Ohler ......................... 701/209
6,873,904 B1 * 3/2005 Yamamoto et al. ......... 701/200

FOREIGN PATENT DOCUMENTS

| DE | 199 56 108 | 5/2001 |
| EP | 0 715 289 | 6/1996 |
| EP | 0 849 563 | 6/1998 |
| EP | 1 221 588 | 7/2002 |
| JP | 9-113290 | 5/1997 |

OTHER PUBLICATIONS

European Search Report dated Nov. 26, 2004.

* cited by examiner

*Primary Examiner*—Y. Beaulieu
(74) *Attorney, Agent, or Firm*—Armstrong, Kratz, Quintos, Hanson & Brooks, LLP

(57) ABSTRACT

A number of traveling routes are determined by computations, using a route processor and map information on the basis of current position information and destination information. The rating of the current traffic jam or the predicted traffic jam on each of the traveling routes is recognized based on a traffic jam prediction table and a calendar table obtained by statistically processing VICS data and past traffic conditions in terms of temporal elements. The number of traveling routes to which candidate traveling routes are narrowed is increased as the traffic jam rating is raised. Thus, the number of candidate traveling routes from which a user can select the actual traveling route is increased as the traffic jam rating rises in order to accommodate a situation where secondary traffic jams can take place on any candidate traveling route, thereby providing the user with useful traveling route information and appropriate guidance.

40 Claims, 20 Drawing Sheets

FIG. 2
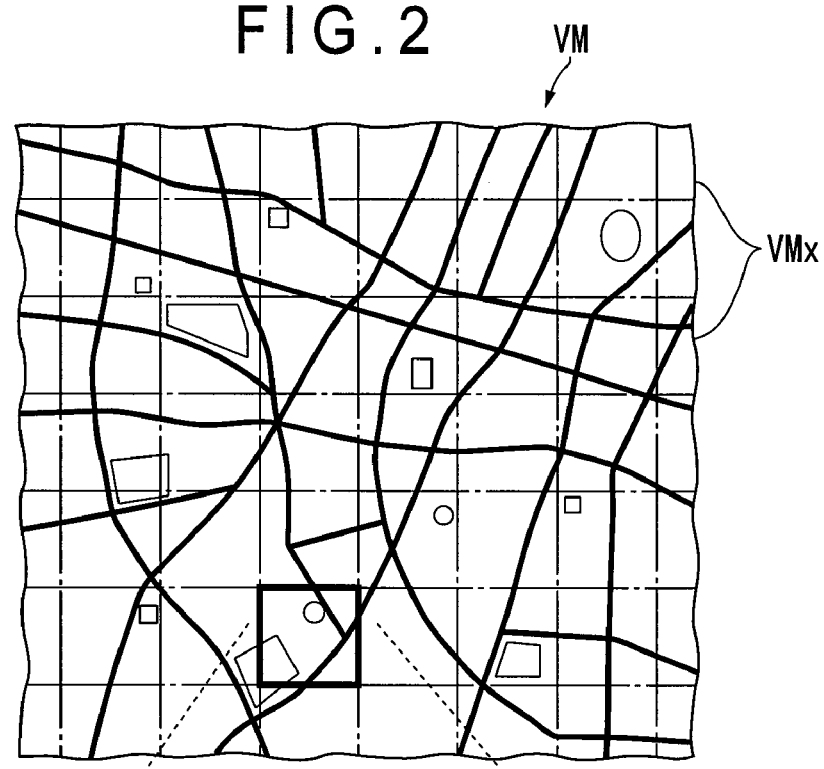
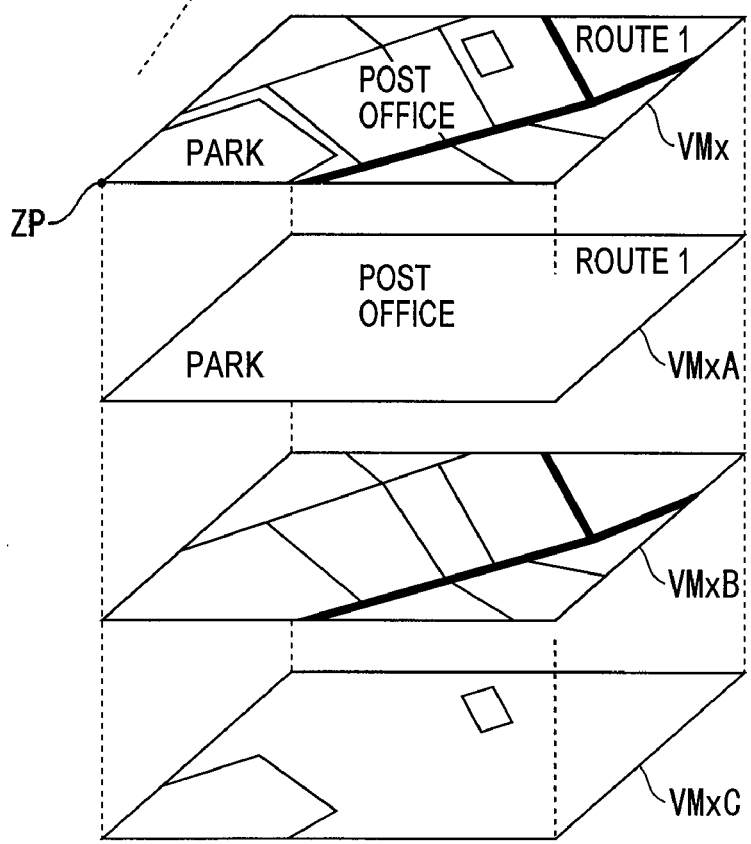

FIG.3
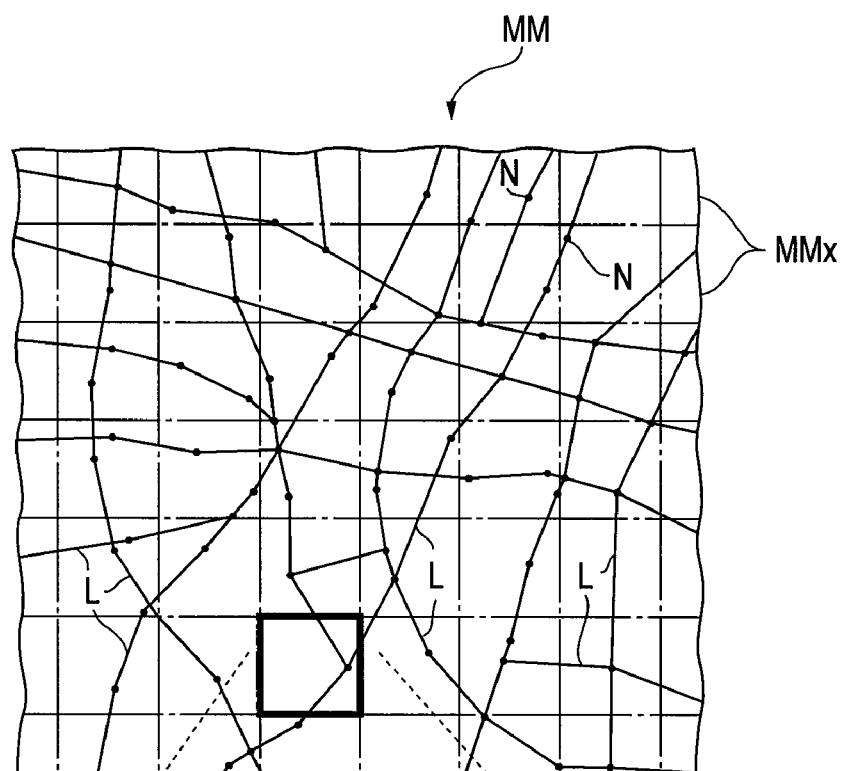
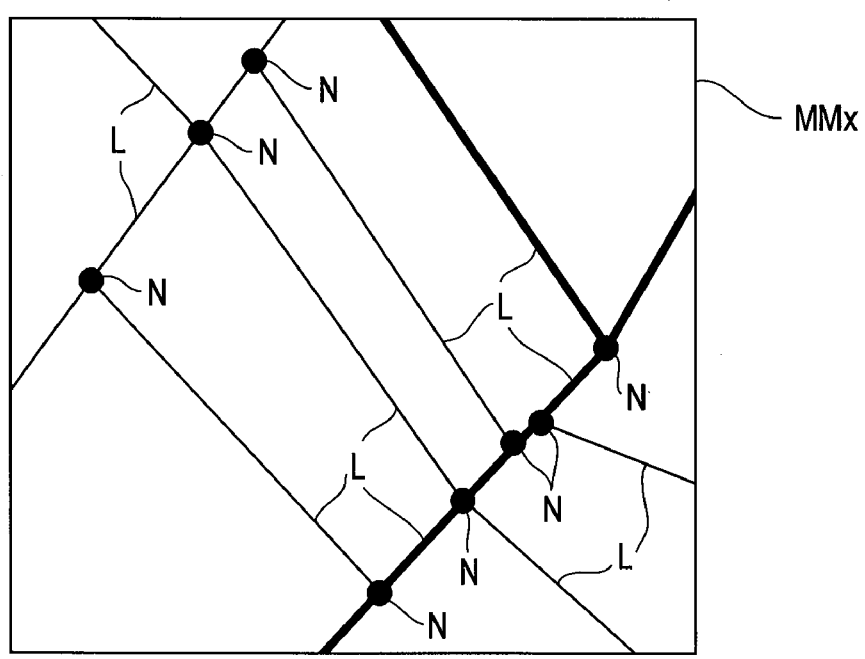

FIG. 4

TRAFFIC JAM PREDICTION TABLE

| DATE CLASSIFICATION | WORK DAY | SATURDAY | SUNDAY LEGAL HOLIDAY | SPECIAL DAY 1 | SPECIAL DAY 2 | ... | DAY BEFORE LONG HOLIDAY | STARTING DAY OF LONG HOLIDAY | MIDDLE DAY OF LONG HOLIDAY | FINAL DAY OF LONG HOLIDAY | DAY BEFORE THE END OF LONG HOLIDAY |
|---|---|---|---|---|---|---|---|---|---|---|---|
| DATE CLASSIFICATION ID | ID 1 | ID 2 | ID 3 | ID 4 | ID 5 | ID 6 | ID 7 | ID 8 | ID 9 | ID 10 | ID 11 |
| | ⋮ TIME SERIES DATA | ⋮ TIME SERIES DATA | ⋮ | | | | | | | | ⋮ |

| SUNDAY | MONDAY | TUESDAY | WEDNESDAY | THURSDAY | FRIDAY | SATURDAY |
|---|---|---|---|---|---|---|
|  | 1<br>ID 1 | 2<br>ID 1 | 3<br>ID 1 | 4<br>ID 1 | 5<br>ID 1 | 6<br>ID 2 |
| 7<br>ID 3 | 8<br>ID 1 | . . . | . . . | . . . | . . . | . . . |
| . . . | . . . | . . . | . . . | . . . | . . . | . . . |
| . . . | . . . | . . . | . . . | . . . | . . . | . . . |
| 28<br>ID 3 | 29<br>ID 1 | 30<br>ID 1 | 31<br>ID 1 | . . . | . . . | . . . |

| SUNDAY | MONDAY | TUESDAY | WEDNESDAY | THURSDAY | FRIDAY | SATURDAY |
|---|---|---|---|---|---|---|
|  | 1<br>ID 1 | 2<br>ID 1 | 3<br>ID 1 | 4<br>ID 1 | 5<br>ID 4 | 6<br>ID 2 |
| 7<br>ID 3 | 8<br>ID 1 | ... | ... | ... | ... | ... |
| ... | ... | ... | ... | ... | ... | ... |
| ... | ... | ... | ... | ... | ... | ... |
| 28<br>ID 3 | 29<br>ID 1 | 30<br>ID 1 | 31<br>ID 1 |  |  |  |

20

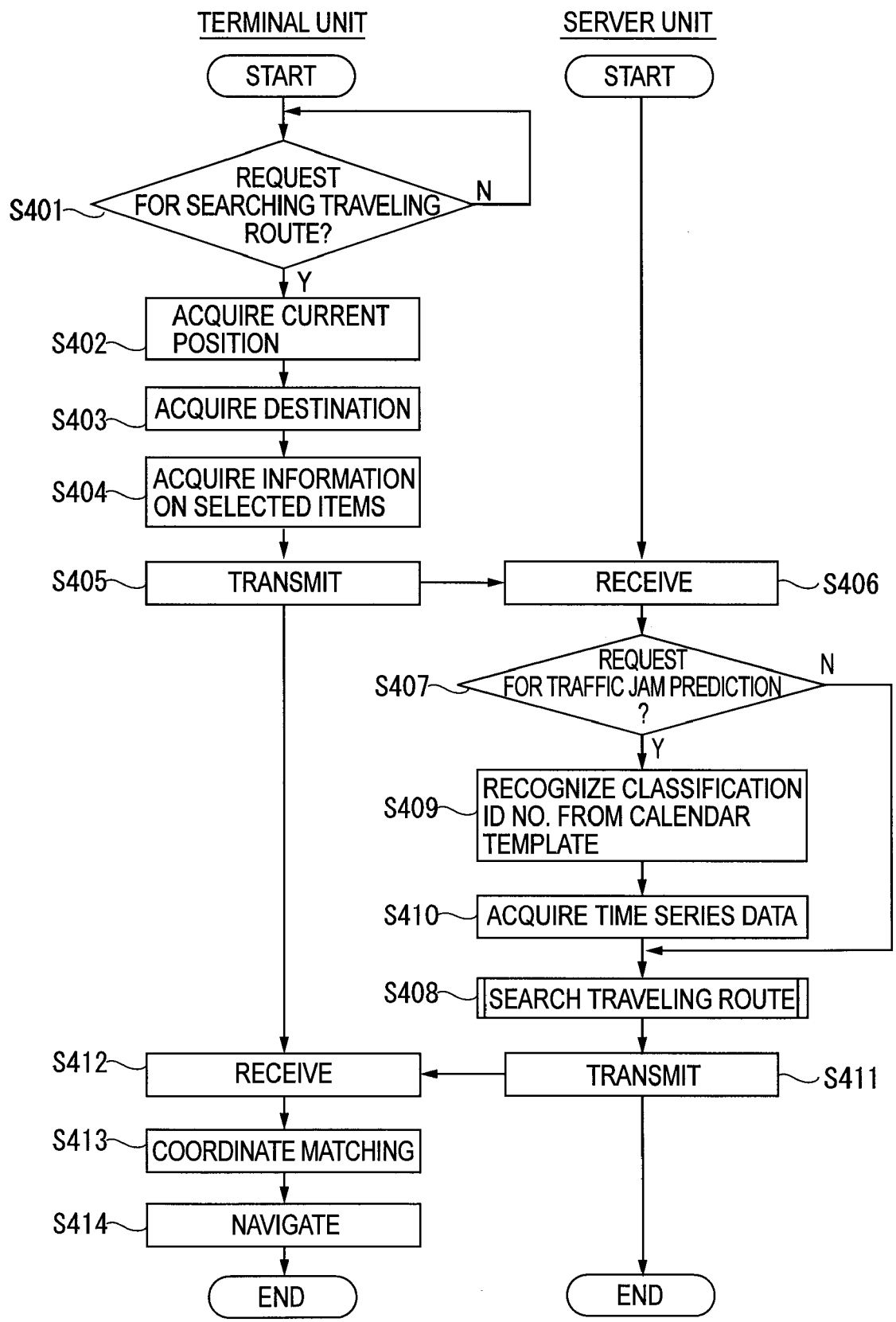

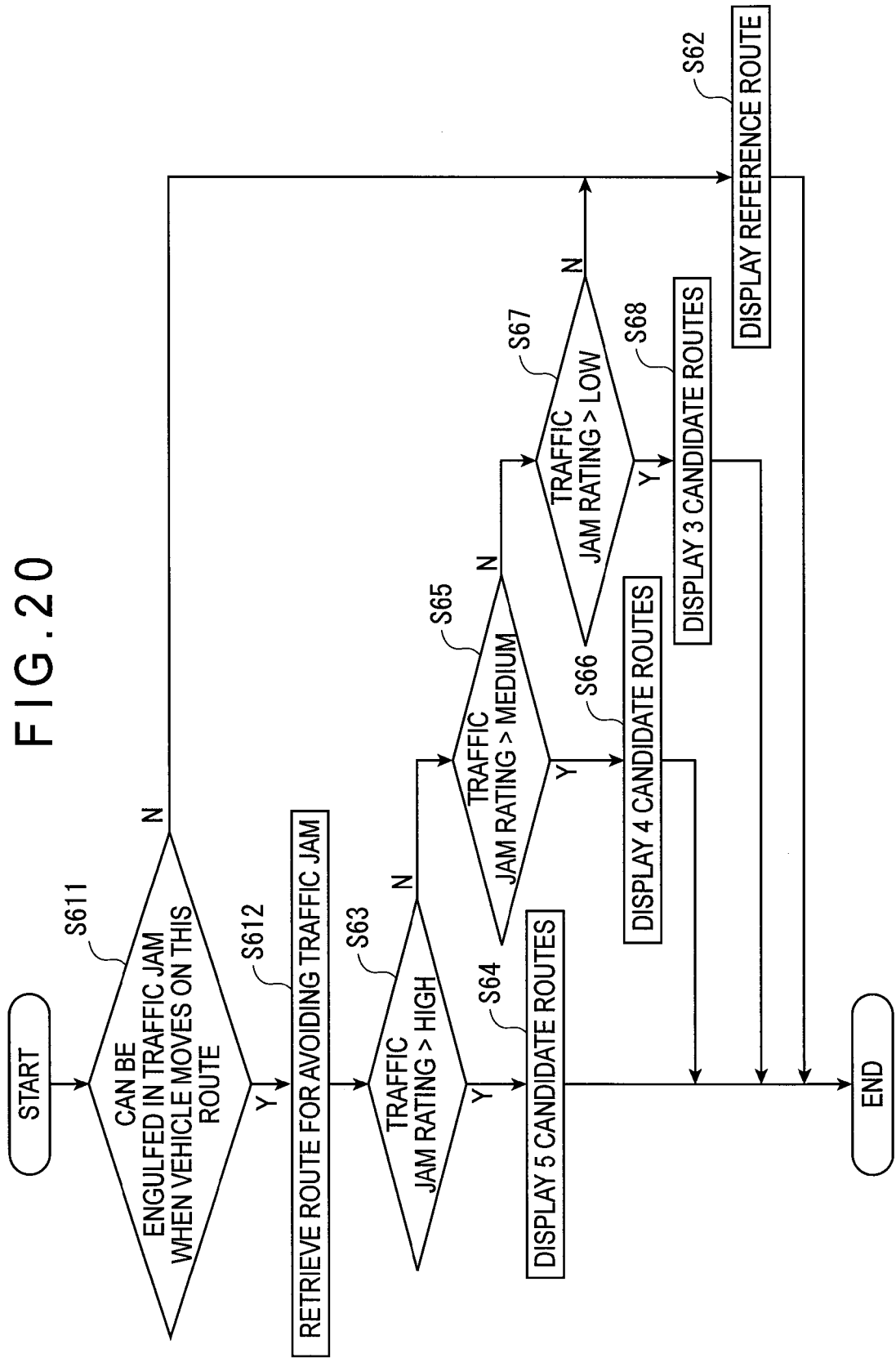

DEVICE, SYSTEM, METHOD AND PROGRAM FOR NAVIGATION AND RECORDING MEDIUM STORING THE PROGRAM

BACKGROUND OF THE INVENTION

1. Field of the Invention

The present invention relates to a device, a system, a method and a program for navigation and also to a recording medium storing the program.

2. Description of Related Art

Vehicle navigation devices adapted to acquire traffic information (VICS data) on vehicle accidents, traffic jams and so on from a vehicle information communication system (VICS) and superimpose the acquired traffic information (on vehicle accidents, traffic jams and so on) on the map being displayed on a display unit for the purpose of notifying a user are known. Meanwhile, when a traffic jam occurs, drivers who want to avoid the traffic jam may make a detour to consequently give rise to a secondary traffic jam. Because the vehicle information communication system provides only the current traffic condition, drivers who make a detour, seeing the current traffic condition provided by the system, can be engulfed in a secondary traffic jam. Thus, there is a demand for improved vehicle navigation devices that allow users to avoid traffic jams and take the best route to get to the destination.

On the other hand, vehicle navigation devices adapted to predict the traffic condition for now and in the future by using statistic data on traffic jams obtained by statistically processing information on past traffic jams and notify users of the predicted traffic condition for now and in the future are known (for example, Japanese Patent Laid-Open Publication No. Hei 9-113290, p. 3, right column—p. 7, left column). A vehicle navigation device described in the above-cited patent document is adapted to provide a vehicle user with statistic traffic jam information as classified on the basis of the days of the week and the time zones of a day by superimposing the statistic traffic jam information on the map being displayed on the display unit. Thus, the vehicle user can predict the traffic jams that can take place now and those that can take place in the future according to the traffic jam information for the day of the week and the time zones of a day.

With the vehicle navigation device as disclosed in the above-cited patent document, the traffic jam information of which the vehicle user is notified is obtained by statistically processing traffic jam information in the past and hence based on the statistic traffic jam data of the past and only tells statistic facts on the traffic jams in a specific time zone on a specific day of the week. In other words, the vehicle user cannot recognize how the current traffic jams, if any, will progress with time. Additionally, the vehicle user may not have to make a detour if the current traffic jam on the road ahead is dissolved before the vehicle gets there. Thus, the vehicle user needs to recognize how the current traffic jams, if any, will progress with time in order for the vehicle to move smoothly. Then, the vehicle user needs to be notified of statistic information on traffic jams before and after the time zone and selects the route to take on the basis of the statistic information. However, it will be cumbersome for the vehicle user to recognize how the current traffic jams will progress with time while driving the vehicle.

SUMMARY OF THE INVENTION

An object of the present invention is to provide a navigation device, a navigation system, a navigation method, a navigation program and a recording medium storing the program.

A navigation device according to an aspect of the present invention includes: a map information acquirer for acquiring map information; a current position information acquirer for acquiring current position information on a current position of a moving body; a destination information acquirer for acquiring destination information on a location of a destination to which the moving body moves; a traffic information acquirer for acquiring traffic information on a traffic condition relating to the moving body; a traveling route searcher that can search a plurality of traveling routes of the moving body on the basis of the current position information and the destination information and by using the map information; a trouble extent recognizer for recognizing an extent of trouble for the moving body to move on each of the searched traveling routes on the basis of the traffic information acquired by the traffic information acquirer; and a notifier for notifying at least one of the plurality of traveling routes searched by the traveling route searcher, in which the traveling route searcher searches the traveling route so as to increase a number of traveling routes to be notified by the notifier as a function of increase in the extent of trouble as recognized by the trouble extent recognizer.

A navigation device according to another aspect of the present invention includes: a map information acquirer for acquiring map information; a current position information acquirer for acquiring current position information on a current position of a moving body; a destination information acquirer for acquiring destination information on a location of a destination to which the moving body moves; a statistic traffic information acquirer for acquiring statistic traffic information obtained by statistically processing a past traffic condition in terms of a temporal element; a traffic condition recognizer for recognizing a traffic condition at a predetermined clock time of a predetermined date on the basis of the statistic traffic information; a traveling route searcher that can search a plurality of traveling routes of the moving body on the basis of the current position information and the destination information and by using the map information; a trouble extent recognizer for recognizing an extent of trouble for the moving body to move on each of the searched traveling routes on the basis of the traffic information acquired by the traffic condition recognizer; and a notifier for notifying at least one of the plurality of traveling routes searched by the traveling route searcher, in which the traveling route searcher searches the traveling route so as to increase a number of traveling routes to be notified by the notifier as a function of increase in the extent of trouble as recognized by the trouble extent recognizer.

A navigation device according to still another aspect of the present invention includes: a map information acquirer for acquiring map information; a current position information acquirer for acquiring current position information on a current position of a moving body; a traffic information acquirer for acquiring traffic information on a traffic condition relating to the moving body; a trouble extent recognizer for recognizing an extent of trouble for the moving body to move on each of the searched traveling routes on the basis of the traffic information acquired by the traffic information acquirer; a traveling route searcher for searching a plurality of traveling routes to avoid an area with the trouble using the map information on the basis of the current position information by recognizing the trouble and the extent of trouble by the trouble extent recognizer; and a notifier for notifying at least one of the plurality of traveling routes searched by the traveling route searcher, in which the traveling route searcher searches the traveling route so as to increase a number of traveling routes to be notified by the notifier as a function of increase in the extent of trouble as recognized by the trouble extent recognizer.

A navigation device according to further aspect of the present invention includes: a map information acquirer for acquiring map information; a current position information acquirer for acquiring current position information on a current position of a moving body; a statistic traffic information acquirer for acquiring statistic traffic information obtained by statistically processing a past traffic condition in terms of a temporal element; a traffic condition recognizer for recognizing a traffic condition at a predetermined clock time of a predetermined date on the basis of the statistic traffic information; a trouble extent recognizer for recognizing an extent of trouble for the moving body to move on the basis of the traffic condition recognized by the traffic condition recognizer; a traveling route searcher that can search a plurality of traveling routes to avoid an area with the trouble using the map information on the basis of the current position information by recognizing the trouble and the extent of trouble by the trouble extent recognizer; and a notifier for notifying at least one of the plurality of traveling routes searched by the traveling route searcher, in which the traveling route searcher searches the traveling route so as to increase a number of traveling routes to be notified by the notifier as a function of increase in the extent of trouble as recognized by the trouble extent recognizer.

A navigation system according to still further aspect of the present invention includes: a server having a storage for storing map information; and the above navigation device for acquiring the map information from the server via a network.

A navigation system according to still further aspect of the present invention includes: a server having a map information storage for storing map information and a statistic traffic information storage for storing statistic traffic information; and the above navigation device for acquiring the map information and the statistic traffic information from the server via a network.

A navigation method according to still further aspect of the present invention includes the steps of: acquiring map information, current position information on a current position of a moving body, destination information on a location of a destination to which the moving body moves and traffic information on a traffic condition relating to the moving body; recognizing an extent of trouble using the map information for the moving body to move on each of traveling routes searched on the basis of the current position information and the destination information on the basis of the traffic information; and increasing a number of traveling routes to be notified as a function of increase in the recognized extent of trouble.

A navigation method according to still further aspect of the present invention includes the steps of: acquiring map information, current position information on a current position of a moving body, destination information on a location of a destination to which the moving body moves and a traffic condition at a predetermined clock time of a predetermined date provided on the basis of statistic traffic information obtained by statistically processing a past traffic condition in terms of a temporal element; recognizing an extent of trouble using the map information for the moving body to move on each of traveling routes searched on the basis of the current position information and the destination information on the basis of the traffic condition; and increasing a number of traveling routes to be notified as a function of increase in the recognized extent of trouble.

A navigation method according to still further aspect of the present invention includes the steps of: acquiring map information, current position information on a current position of a moving body and traffic information on a traffic condition relating to the moving body; recognizing a trouble and an extent of trouble for the moving body to move on a traveling route on the basis of the traffic information; and searching a traveling route for avoiding an area with the trouble on the basis of the current position information, using the map information, so as to increase a number of traveling routes for avoiding the area with the trouble as a function of increase in the recognized extent of trouble.

A navigation method according to still further aspect of the present invention includes the steps of: acquiring map information, current position information on a current position of a moving body and a traffic condition at a predetermined clock time of a predetermined date provided on the basis of statistic traffic information obtained by statistically processing a past traffic condition in terms of a temporal element; recognizing a trouble and an extent of trouble for the moving body to move on the basis of the traffic condition; and searching a traveling route for avoiding an area with the trouble on the basis of the current position information, using the map information, so as to increase a number of traveling routes for avoiding the area with the trouble as a function of increase in the recognized extent of trouble.

A navigation program according to still further aspect of the present invention executes the above navigation method by a computer.

A recording medium according to still further aspect of the present invention stores the above navigation program in a manner readable by a computers.

BRIEF DESCRIPTION OF THE DRAWINGS

FIG. 2 is a schematic conceptual illustration of a table structure of data to be displayed on a map of the first embodiment;

FIG. 3 is a schematic conceptual illustration of a table structure of matching data to be displayed on a map of the first embodiment;

FIG. 4 is a schematic conceptual illustration of a table structure of data in a traffic jam prediction table of the first embodiment;

FIG. 5 is a schematic conceptual illustration of a table structure of data in a calendar template of the first embodiment;

FIG. 8 is a schematic conceptual illustration of the table structure of data in the calendar template as updated by a calendar modifying section of the first embodiment;

FIGS. 12A through 12C are schematic illustrations of images of a traveling route that can be displayed by the first embodiment, in which FIG. 12A is a schematic illustration of an image that can be displayed when the embodiment searches for a traveling route to a selected position, FIG. 12B is a schematic illustration of an image that can be displayed when the embodiment re-searches for a traveling route to the position when a predetermined time period has elapsed from FIG. 12A, and FIG. 12C is a schematic illustration of an image that can be displayed when the embodiment re-searches for a traveling route to the position when a predetermined time period has elapsed from FIG. 12B;

FIG. 19 is a flow chart of the operation of searching for a traveling route of the second embodiment; and FIG. 20 is a flow chart of the operation of selecting the number of candidate traveling routes of still another embodiment of the present invention.

DETAILED DESCRIPTION OF PREFERRED EMBODIMENT(S)

[First Embodiment]

Now, the first embodiment of the present invention will be described by referring to the accompanying drawings. This embodiment of navigation device is a vehicle navigation device for navigating a driver of a moving body, or a vehicle, in response to the moving condition thereof. However, it should be noted that a navigation device according to the present invention is not necessarily arranged in a vehicle. It can be arranged in any moving body in order to notify the driver of the moving body of the traffic condition thereof.

Figure 1:
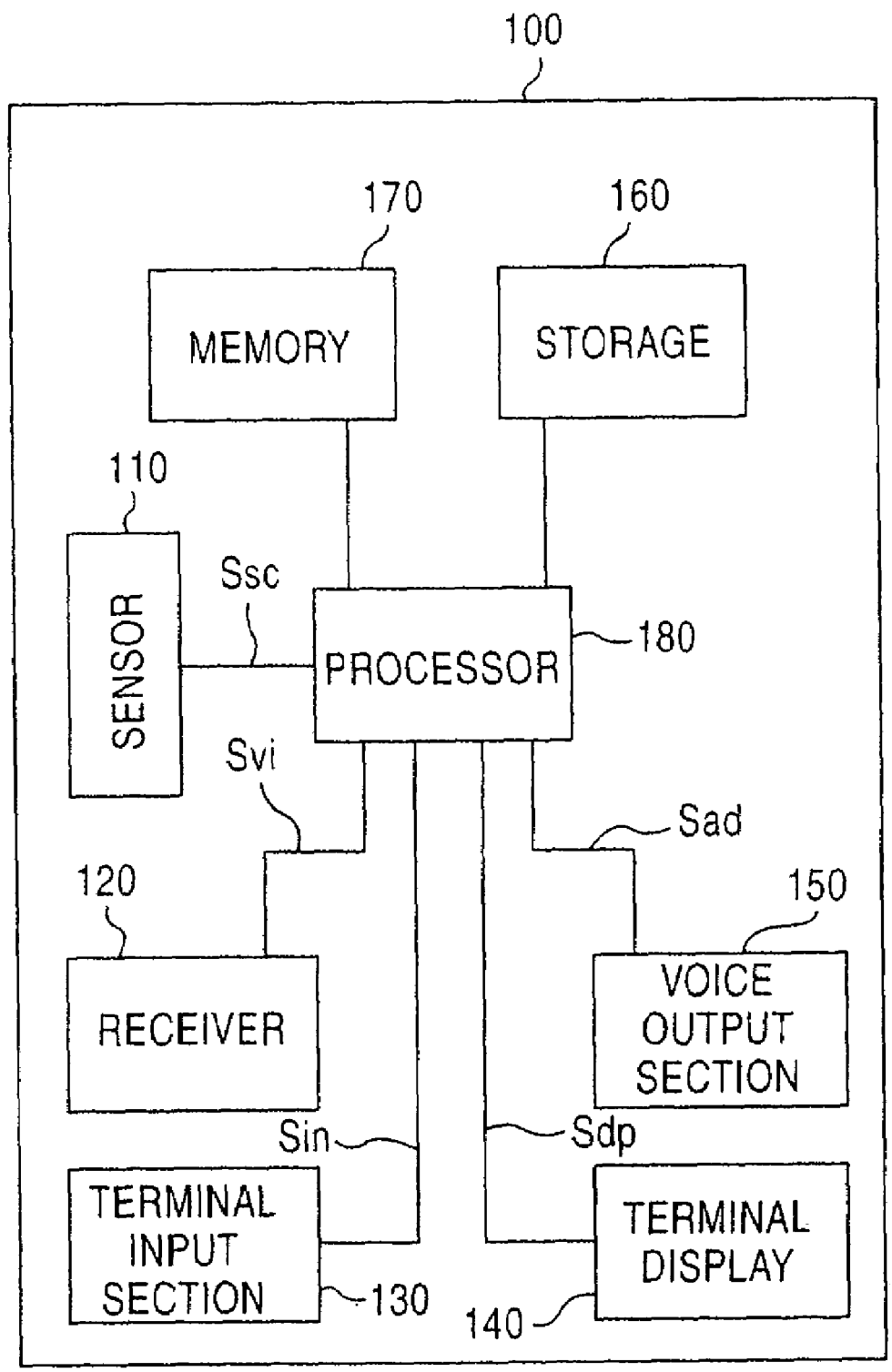
FIG. 1 is a schematic block diagram of a first embodiment of navigation device according to the present invention, showing the configuration thereof.
Figure 6:
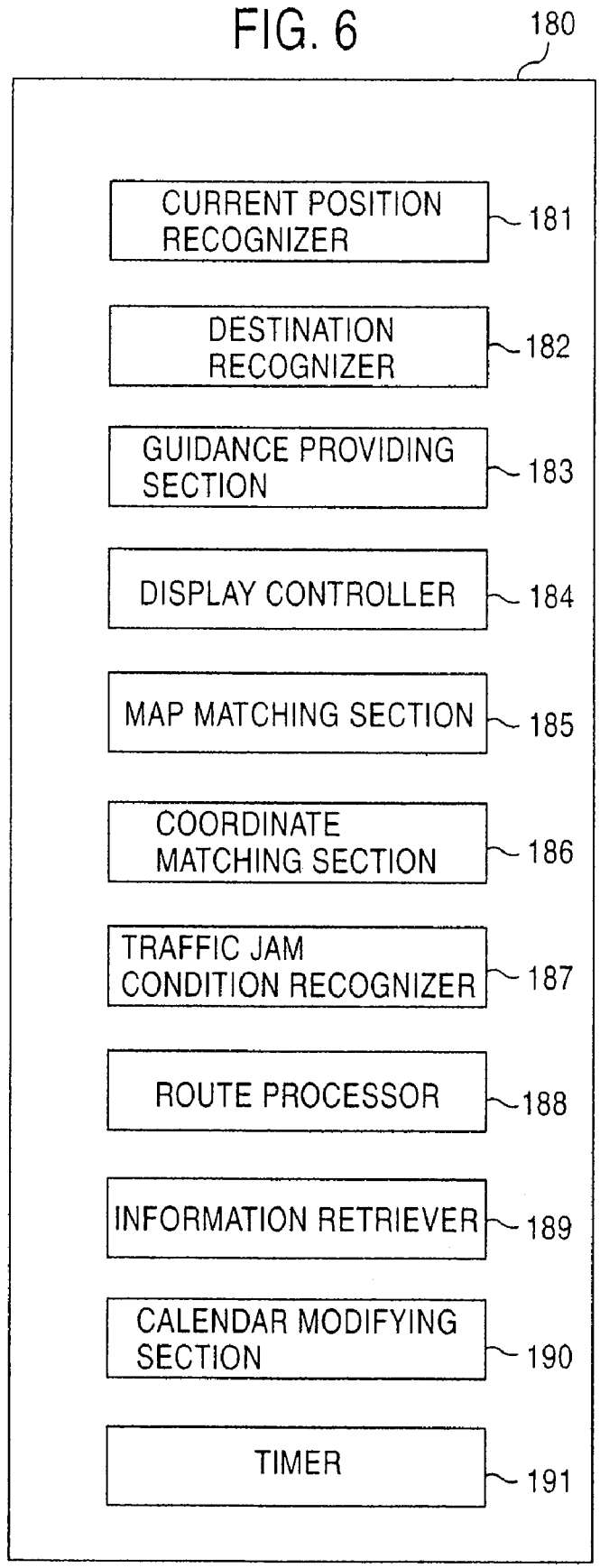
FIG. 6 is a schematic block diagram of a processor of the navigation device of the first embodiment.

FIG. 1 is a schematic block diagram of the first embodiment of navigation device, showing the configuration thereof. FIG. 2 is a schematic conceptual illustration of the table structure of data to be displayed on a map. FIG. 3 is a schematic conceptual illustration of the table structure of matching data to be displayed on a map. FIG. 4 is a schematic conceptual illustration of the table structure of data in a traffic jam prediction table. FIG. 5 is a schematic conceptual illustration of the table structure of data in a calendar template. FIG. 6 is a schematic block diagram of a processor of the navigation device.

[Configuration of Navigation Device]

In FIG. 1, reference symbol 100 denotes a navigation device that is a traffic condition notifying device. The navigation device 100 navigates a user of a vehicle, or a moving body in response to the moving condition of the vehicle. However, for the purpose of the present invention, a moving body is not limited to a vehicle and may alternatively be an aircraft or a ship. The navigation device 100 may be realized in the form of a vehicle-mounted type device to be mounted in a vehicle, a portable type device, a PDA (personal digital assistant), a portable phone, a PHS (personal handyphone system), a portable personal computer or the like. The navigation device 100 searches for information on the current position and the destination on the basis of the map information it has. It also searches for and displays the traveling route to the destination as well as a predetermined store that is located in the vicinity of the current position of the vehicle and operates as landmark, including the services the store provides. As shown in FIG. 1, the navigation device 100 includes a sensor 110, a VICS (vehicle information communication system) receiver 120 that operates as traffic information acquirer, a terminal input section 130, a terminal display 140 that is a display unit and operates as notifying section, a voice output section 150 that operates as notifying section, a storage 160, a memory 170, a processor 180 and so on.

The sensor 110 detects the moving condition of the moving body on which it is mounted, which may be a vehicle, including the current position and the running condition of the vehicle, and outputs signal Ssc of a predetermined format that represents the moving condition to the processor 180. The sensor 110 typically has various sensors including a GPS (global positioning system) receiver (not shown), a speed sensor (not shown), an azimuth sensor and an acceleration sensor.

The GPS receiver receives the navigation electric wave output from the GPS satellite (not shown), which is an artificial satellite, by means of a GPS antenna (not shown). It then computes the assumed coordinate values of the current position according to the received signal of the navigation electric wave and outputs the outcome of the computation to the processor 180 as GPS data.

The speed sensor of the sensor 110 is arranged on the moving body, which may be a vehicle, to detect the running speed and the actual acceleration of the vehicle according to a signal that varies as a function of the traveling speed, or the moving speed, of the vehicle. The speed sensor typically reads the pulse signal or the voltage value that is output as a function of the revolutions per unit time of the axles or the wheels of the vehicle. Then, the speed sensor outputs the detected information, or the pulse signal or the voltage value it reads, to the processor 180. The azimuth sensor of the sensor 110 is also arranged on the vehicle and has a gyro-sensor (not shown) to detect the azimuth of the vehicle, or the running direction of the forwardly moving vehicle. The azimuth sensor outputs a signal, which is the detected information representing the detected running direction, to the processor 180. The acceleration sensor of the sensor 110 is also arranged on the vehicle to detect the acceleration of the vehicle in the running direction thereof. The acceleration sensor typically converts the detected acceleration into a sensor output value in the form of a pulse or a voltage and outputs it to the processor 180.

The VICS receiver 120 has a VICS antenna (not shown) and acquires traffic information by way of the antenna. More specifically, it acquires traffic information (to be referred to as VICS data hereinafter) on traffic jams, traffic accidents, road construction works, traffic control operations and so on from the VICS (not shown) by way of a beacon or FM multiplex broadcasting and outputs signal Svi of a predetermined format relating to the acquired traffic information to the processor 180.

VICS data has a table structure typically containing a plurality of conceptual items that are coordinated into a single data as shown below.

traffic jam rating: traffic jams, congestions, smooth traffic, etc.

leading position of each traffic jam length of each traffic jam link traveling time information: the traveling time necessary for the vehicle to run between two consecutive traffic lights, which is a VICS link road section traveling time information: the traveling time necessary for the vehicle to run by a given road section that is longer than the distance of a VICS link restrictions, causes of restrictions, restricted road sections information on vacancies in parking areas information on service areas and parking areas other information The terminal input section 130 typically includes a keyboard or a mouse as well as various operation buttons and operation knobs (not shown) to be used for input operations. The operation buttons and the operation knobs are used to specify, for example, operations of the navigation device 100. More specifically, they may be used to specify the type of information to be acquired and/or the requirements to be met when acquiring information, to specify the destination, to retrieve information and to cause the running condition, or the moving condition of the vehicle, to be displayed. In response to an operation by the vehicle user, the terminal input section 130 outputs a predetermined signal Sin to the processor 180. In addition to or in place of the operation buttons and the operation knobs, the terminal input section 130 may include a touch panel that may be arranged at the terminal display 140 for input operations and a voice input section.

The terminal display 140 is controlled by the processor 180 and adapted to display images for signal Sdp from the processor 180. Images that are displayed on the terminal display 140 include map information and images of retrieved information, TV programs received by a TV receiver (not shown), images stored in one or more than one external devices such as optical disks, magnetic disks, memory cards and other recording mediums and read by respective drives or drivers and images from memory 170. The terminal display 140 may typically include a liquid crystal panel, an organic EL (electroluminescence) panel, a PDP (plasma display panel) or a CRT (cathode ray tube).

The voice output section 150 includes a speaker or some other sounding unit (not shown). The voice output section 150 is controlled by the processor 180 and outputs voices by way of the sounding unit for various signals Sad from the processor 180 including those for voice data. Voiced information output from the voice output section 150 includes the running direction and the running condition of the vehicle, the traffic condition and so on. The vehicle user is notified of and navigated by the voiced information. The sounding unit may be used to output TV sounds received by a TV receiver (not shown) and sounds stored in the memory 170. The voice output section 150 may additionally utilize some other sounding unit with which the vehicle is provided as standard equipment.

The storage 160 readably stores map information for maps as shown in FIGS. 2 and 3 and a traffic jam prediction table 10 as shown in FIG. 4. The storage 160 includes, though not shown, a map information storage area for storing maps and a traffic jam prediction table storage area for storing the traffic jam prediction table 10. However, the storage 160 does not necessarily have the two storage areas that are specifically described above and may have no storage area or include some other storage areas. The storage 160 may include drives or drivers for readably storing data on storage mediums such as HDs (hard disks), DVDs (digital versatile disks), optical disks and memory cards.

For the purpose of the present invention, map information includes display data VM, which are so-called POI (point of interest) data for maps as shown in FIG. 2, matching data MM for maps as shown in FIG. 3, map data for searching for the traveling route and so on.

Display data VM include a plurality of pieces of display mesh information VMx, each carrying a specific suffix number. More specifically, the map of a given geographical area that is formed by display data VM is vertically and horizontally divided into a plurality of pieces of display mesh information VMx. Each piece of the display mesh information VMx may be further divided into a plurality of pieces of display sub-mesh information VMx. The display mesh information VMx are rectangles with same dimensions and show respective geographical strips with a reduced scale. The map information is provided at a corner thereof with a geographical index of the entire map, which may be values expressed in terms of the absolute coordinates ZP of the earth.

Each of mesh information VMx contains, for example, name information VMxA that designates a name of crossings etc., road information VMxB and background information VMxC. The name information VMxA such as the names of the crossings and other spots are miscellaneous elemental data of the strip that are arranged in a table structure. They are adapted to be displayed at predetermined respective positions in terms of the absolute coordinates ZP. The road information VMxB are road elemental data of the strip that are arranged in a table structure. They are adapted to be displayed at predetermined respective positions in terms of the absolute coordinates ZP. The background information VMxC includes marks of well-known buildings and other spots. They are also miscellaneous elemental data of the strip that are arranged in a table structure and adapted to be displayed at predetermined respective positions in terms of the absolute coordinates ZP.

On the other hand, matching data MM include a plurality of pieces of matching mesh information MMx, each carrying a specific suffix number. More specifically, as in the case of the display data VM, the map information of a given geographical area is vertically and horizontally divided into a plurality of pieces of matching mesh information MMx. Each piece of the matching mesh information MMx may be further divided into a plurality of matching sub-mesh information MMx. The matching mesh information MMx are rectangles with same dimensions and show respective geographical strips with a reduced scale. The map information is provided at a corner thereof with a geographical index of the entire map, which may be values expressed in terms of the absolute coordinates ZP of the earth. Each piece of matching mesh information MMx may have a data structure that is different from that of each piece of display mesh information VMx. In other words, the matching mesh information MMx may have dimensions different from those of the display mesh information VMx. If both the display mesh information VMx and the matching mesh information MMx have the same reduced dimensions, the data of the display mesh information VMx and those of the corresponding matching mesh information MMx may be provided with the same and unique number to identify their relationship. If the display mesh information VMx have reduced dimensions different from those of the matching mesh information MMx, the relationship between the data of the display mesh information VMx and those of the corresponding matching mesh information MMx may typically be identified by means of the absolute coordinates.

When, for example, a symbol representing the moving vehicle is superimposed on the map information, the matching data MM are used to prevent from being placed not on the road but on a building by error. In other words, the matching data MM are used for map matching processing for placing the symbol of the vehicle on the right road. The matching data MM includes a plurality of pieces of link string block information.

Link string block information as used herein refers to information having a table structure showing correlations of links L that are line segments, each connecting a pair of nodes N representing respective spots on a road as shown in FIG. 3. The correlations of links L are established on the basis of predetermined rules. For example, a road, which may be the Koshu Road or the Ome Road, is expressed as a link string that is formed by a number of mutually correlated broken lines, or links L. Each link L is provided with line-segment-specific information, that is a suffix number of the link L and node information specific to each of the pair of nodes N connected by the link L (hereinafter to be referred to as link ID). Each link L is correlated to VICS links to show positional correspondence between VICS data and a displayed map.

A node N may represent a road crossing, a bending point of a road, a fork of roads or a junction of roads. The information on a node N includes spot-specific-information that is a suffix number of the node N in the link string block information, the coordinates of the position of the node N and a flag that indicates if the node represents a branching position such as a road crossing or a fork of roads, where a plurality of links meet, or not. The information on a node N may alternatively include only spot specific-information and coordinates and does not include a flag so that it shows only the profile of each of the links, or roads, related to the node. Still alternatively, it may include information on the attributes of the links related to it such as information on the width and the number of lanes of each of the links, or roads, related to the node. If a node N does not have a flag and shows only the profile of each of the roads related to it, it will not be used to identify the spot by coordinate matching section 186, which will be described hereinafter Map information for searching the traveling route of the vehicle typically have a table structure similar to that of the matching data MM. In other words, they have a table structure with spot information on spots on roads as represented by nodes N and link information on line segment information on line segments as represented by links L. They are used for the purpose of searching for the traveling route of the vehicle.

The traffic jam prediction table 10 provides statistic traffic information obtained by statistically processing past traffic conditions in terms of the time zones of a day (temporal element). It includes data showing traffic conditions of a geographical location in the past. The traffic jam prediction table 10 is used to predict traffic jams when searching for the traveling route or when displaying a map. The traffic jam prediction table 10 has a table structure as shown in FIG. 4, where a plurality of combinations of a date classification ID (identification) 11 and time series data 12i (i being a natural number) are recorded and each of the combinations is referred to as a record.

A date classification ID11 is an ID number specific to a particular date of the year and a particular day of the week. In the following description, classification in terms of dates and days of the week is referred to as date classification. For example, "ID1" may indicate any "workday" between Monday and Friday that is not a legal holiday and "ID2" may indicate "Saturday" that is not a legal holiday, whereas "ID4" may indicate "special day 1" which is a festival day of City A and "ID5" may indicate "special day 2" which is a day when sports matches take place in Athletic Ground B. Similarly, "ID7" may indicate the day before four consecutive holidays, or "the day before a long holiday", and "ID11 may indicate the third day of four consecutive holidays, or "the day before the end of a long holiday". Date classification IDs 11 are not necessarily ID numbers. They may alternatively be text data directly and respectively related to dates such as "workdays".

Time series data 12i are data showing tendencies of traffic jam conditions obtained by statistically processing the data acquired, for example, from the VICS, or VICS data, that are accumulated for each VICS link, for every 10 minutes classified as temporal elements by the date classification system. More specifically, time series data 12i may include data showing one or more than one traffic jams at certain locations on each VICS link in predetermined time zones such as the length of each specific one of the traffic jams, the traffic jam ratings or the traffic jam conditions of the traffic jams and the time required for escaping each specific one of the traffic jams. While time series data 12i are described above as data generated by statistically processing data for every time zone that is defined as temporal element by the date classification system, they may not necessarily be limited thereto and may alternatively be generated by using facilities, shops for each administrative unit, which may be a city, a town or a village and/or for each road.

The storage 160 stores retrieval information necessary for acquiring information on a predetermined spot as map information. More specifically, retrieval information include information on the designations of prefectures, cities, towns, villages, districts and areas that are used to pinpoint a spot, guidance information and information on shops that are also used to pinpoint a spot. Retrieval information is stored to show a table structure where pieces of information on items are arranged hierarchically in the form of tree structure.

The memory 170 readably stores information on specified items that are input at the terminal input section 130, music data and image data as well as a plurality of calendar templates 20 as shown in FIG. 5. The memory 170 also stores various application programs to be developed on the OS (operating system) of the navigation device 100 that controls the operation of the entire navigation device 100. The memory 170 preferably includes a CMOS (complementary metal-oxide semiconductor) memory that retains the data it stores even in the case of black out where the power supply is suddenly interrupted. The memory 170 may alternatively includes a drive or a driver for readably storing data on a recording medium such as HD, DVD or optical disk.

The calendar templates 20 are templates showing date classification of dates. More specifically, each calendar template 20 contains table data including dates, classification ID numbers assigned to respective dates and so on and typically a total of twelve calendar templates are provided to correspond to the months of a year so as to form a table structure.

A classification ID number is the same as one of the date classification IDs 11 of traffic jam prediction tables 10 and indicates the date classification of a date specified by date information. For example, Friday 5th is classified as "workday" that is identified by "ID1", whereas Monday 15th is classified as "legal holiday" that is identified by "ID3". The classification ID numbers of the calendar templates 20 may be modified appropriately by the processor 180. The classification ID numbers are not necessary numerical values and may alternatively be so arranged as to show a data structure using text data corresponding to the date classification IDs of the traffic jam prediction tables 10 such as "workday".

The processor 180 has various input/output ports (not shown) including a VICS reception port connected to a VICS antenna, a GPS reception port connected to a GPS receiver, sensor ports connected to respective various sensors, a key input port connected to the terminal input section 130, a display control port connected to the terminal display 140, a voice control port connected to the voice output section 150, a storage port connected to the storage 160 and a memory port connected to the memory 170. As shown in FIG. 6, the processor 180 has as various programs a current position recognizer 181 which operates as current position acquirer, a destination recognizer 182 which operates as destination information acquirer, a guidance providing section 183 which operates as part of notifying section, a display controller 184 which also operates as part of notifying section, a map matching section 185, a coordinate matching section 186, a traffic jam condition recognizer 187 that is a traffic condition recognizer or an trouble extent recognizer which also operates as traffic map information acquirer and statistic traffic information acquirer, a route processor 188 which operates as traveling route search section, an information retriever 189, a calendar modifying section 190, a timer 191 and so on.

The current position recognizer 181 recognizes the current position of the vehicle. More specifically, it computationally determines a plurality of assumed current positions of the vehicle on the basis of the speed data and the azimuth data output respectively from the speed sensor and the azimuth sensor of the sensor 110. Additionally, the current position recognizer 181 recognizes the current assumed coordinate values of the vehicle on the basis of the GPS data relating to the current position as output from the GPS receiver. Then, the current position recognizer 181 compares the computationally determined assumed current position and the current assumed coordinate values of the vehicle it recognizes and computationally determines the current position of the vehicle on the map information acquired separately to recognize the current position of the vehicle.

Furthermore, the current position recognizer 181 determines the inclination and the level difference of the road on which the vehicle is running on the basis of the acceleration data output from the acceleration sensor and computationally determines the assumed current position of the vehicle to recognize the current position of the vehicle. Thus, it can accurately recognize the current position of the vehicle even at a spot where two or more than two roads intersect each other on a plan view such as a multi-level crossing of an ordinary road or a high way. Additionally, when the vehicle is running on a slope or a mountain road, it corrects the error of the moving distance obtained only on the basis of the speed data and the azimuth data that differs from the actual running distance of the vehicle by taking the detected inclination of the road into consideration to accurately recognize the current position of the vehicle.

The current position recognizer 181 can recognize the starting point that is selected and input by way of the terminal input section 130 also as assumed current position in addition to the above described current position of the vehicle. The various pieces of information acquired by the current position recognizer 181 are stored appropriately in the memory 170.

The destination recognizer 182 typically acquires destination information on the destination of the vehicle as selected and input by operating the terminal input section 130 and recognizes the position of the destination. Pieces of information on the destination that can be selected and input include the coordinate values of the destination as expressed in terms of latitude and longitude, the address of the destination, or the telephone number of the telephone at the destination if they can be used to locate the destination. The destination information recognized by the destination recognizer 182 is appropriately stored in the memory 170.

The guidance providing section 183 provides guidance for driving the vehicle to support the driver on the basis of the information on the traveling route and the information on the map guidance information acquired in advance in response to the running condition of the vehicle and stored in the memory 170. The guidance may be provided in the form of images displayed on the terminal display 140 and/or in voice sounded by the voice output section 150. For example, a predetermined arrow and/or a sign may be displayed on the display screen of the terminal display 140 and/or a voice guidance such as "Turn right toward XX at YY crossing 700 m ahead", "The vehicle deviated from the traveling route" or "A traffic jam is ahead" may be sounded from the voice output section 150.

The display controller 184 appropriately controls the terminal display 140 so as to cause it to display various pieces of information on the terminal display 140. The display controller 184 also controls the terminal display 140 to display images for prompting the user to operate the terminal input section 130 so as to select and input various pieces of information.

The map matching section 185 operates for map matching processing necessary for displaying the current position of the vehicle as recognized by the current position recognizer 181 on the map information obtained from the storage 160. The map matching section 185 typically utilizes matching data MM for map matching processing of modifying or correcting the information on the current position so that the current position of the vehicle as indicated by a mark that is superimposed on the map being displayed on the terminal display 140 may not be shifted from the road in the map on the terminal display 140.

The coordinate matching section 186 operates for coordinate matching processing necessary for determining if the pieces of information on two nodes N contained in the matching data MM of the map information obtained from the storage 160 as spot information indicate the same and identical spot or not. In other words, the coordinate matching section 186 acquires spot information on two nodes N contained in the matching data MM and reads the coordinate information of the spot information. More specifically, it computationally determines the coordinate values of each node N such as the latitude and the longitude on the basis of the coordinate values and the offset quantities contained in the coordinate information and if the nodes show the same and identical coordinate values, it reads the flag in the spot information of each of the nodes N and judges if the nodes are identical with each other or not. If it judges that the two nodes are identical with each other, it determines that two links L that are connected to the respective nodes N and have different pieces of link string block information intersect each other and the nodes N represent the same crossing. If, on the other hand, it judges that the two nodes are not identical with each other, it determines that the two links L that are connected to the respective nodes N and have different pieces of link string block information do not intersect each other and hence the nodes N represent a multi-level crossing etc.

The traffic jam condition recognizer 187 generates current traffic jam information relating to the traffic jam(s) that are currently present. More specifically, it appropriately acquires VICS data from the VICS as output from the VICS receiver 120. Then, it generates current traffic jam information relating to the traffic jam(s) that are currently present in an area containing the current position of the vehicle and the destination or in a predetermined area surrounding the current position of the vehicle.

Additionally, the traffic jam condition recognizer 187 determines the expected arrival time of the vehicle when the vehicle gets to the destination. For example, firstly it determines the expected arrival time of the vehicle when the vehicle gets to a selected position on the route to the destination. Then, it generates traffic jam prediction information relating to prediction of the traffic jam that may arise at the selected position before the vehicle gets to the destination or at a scheduled clock time selected and input in advance on the basis of the acquired expected arrival time, the expected arrival time that is selected and input in advance and the time series data 12i as well as other information.

More specifically, the traffic condition recognizer 187 recognizes the classification ID number of the date for which traffic jam(s) will be predicted on the basis of the clock time information obtained from the timer 191 and the related calendar template 20. Then, it retrieves and acquires the time series data 12i for the area that corresponds to the recognized classification ID number and contains the current position and the destination from the traffic prediction tables 10. Subsequently, it determines the expected arrival time of the vehicle when the vehicle gets to a selected position on the candidate traveling route to the destination as identified by candidate traveling route information generated by the route processor 188, which will be described in greater detail hereinafter, on the basis of the current clock time acquired from the timer 191.

Techniques for determining the expected arrival time include the following. Firstly, the distance to a selected position on the candidate traveling route is recognized from the candidate traveling route information and the time required to travel by the recognized distance is determined on the current traffic jam information. Subsequently, the expected arrival time is determined on the basis of the obtained required time and the current clock time. Then, traffic jam prediction information is generated on the basis of the time series data 12i and the expected arrival time.

The route processor 188 searches for the traveling route by computationally determining the traveling route of the vehicle on the basis of the information on the selected items for defining the route as input by the vehicle user and the map information stored in the storage 160. The route processor 188 can computationally determine the traveling route by taking the current traffic jam information and the predicted traffic jam information as generated by the traffic jam condition recognizer 187 into consideration when the processor 180 recognizes a request for predicted traffic jam information requesting a traveling route to be searched for by considering the current traffic jam information and the predicted traffic jam information.

More specifically, if the information on the selected items does not contain any request for predicted traffic jam information, the route processor 188 simply acquires the current position, the destination, the information on the selected items and the current traffic jam information. Then, it searches for roads on which the vehicle can travel, utilizing the map information for searching the traveling route of the vehicle on the basis of the acquired information, and generates traveling route information in which the route requiring the minimum traveling time, the route of the minimum traveling distance and routes that can avoid traffic jams and traffic control operations are specified. Then, it determines the traveling time required to get to the destination for each of the routes contained in the traveling route information and generates required time information.

If, on the other hand, the information on the selected items contains a request for predicted traffic jam information, the route processor 188 acquires the current position, the destination, the information on the selected items and the current traffic jam information, taking the predicted traffic information into consideration. Then, it searches for roads on which the vehicle can travel and generates candidate traveling route information in which the route requiring the minimum traveling time, the route of the minimum traveling distance and routes that can avoid traffic jams and traffic control operations are specified. Then, it acquires the current traffic jam information and the predicted traffic jam information and generates traveling route information that specifies traveling routes by narrowing the candidate traveling routes contained in the candidate traveling route information to a fewer number of candidate traveling routes on the basis of the acquired information. Then, it determines the traveling time required to get to the destination for each of the routes contained in the traveling route information and generates required time information on the required time for each of the routes.

When searching for the traveling routes, the matching data MM of the map information may be used along with the map information for searching the traveling route of the vehicle when, for example, the traveling route is searched for so as to utilize passages not contained in the map information for searching the traveling route of the vehicle such as back lanes and other lanes. The judgment of the coordinate matching section 186 on road conditions provides basis for searching for the traveling route when the matching data MM are used. The traveling route information also contains route guidance information for guiding and assisting the vehicle user driving the vehicle. The route guidance information may be appropriately displayed on the terminal display 140 and/or sounded from the voice output section 150 under the control of the guidance providing section 183 to assist the vehicle user driving the vehicle.

Additionally, the route processor 188 computationally determines the position of the vehicle at a predetermined time, 30 minutes from now for example, if the vehicle follows the current traveling route, taking the predicted traffic jam information into consideration and using the information and the map information from the sensor 110. More specifically, it computationally determines the traveling distance of the vehicle when a predetermined time has elapsed from now on the basis of the legal limit of speed contained in the map information and the current traffic jam information, which is the past data, and other data and recognizes the position of the vehicle at the predetermined time on the basis of the computationally determined traveling distance, utilizing the matching data MM of the map information. The information on the predicted position is stored in the memory 170.

The information retriever 189 acquires the retrieval information stored in the storage 160, hierarchically retrieving the information on the basis of the specified items such as shops and facilities in response to a retrieval request for retrieval information as specified and input at the terminal input section 130.

The calendar modifying section 190 appropriately updates the calendar templates 20 stored in the memory 170 on the basis of the modifications specified and input by the user. More specifically, the calendar modifying section 190 recognizes various pieces of information specified and input by the user by way of the terminal input section 130. The specified pieces of information may include information on a specific date and information on an event, which may be a festival or sports matches. It recognizes the date specified by the information on the specific date and, at the same time, the classification ID number that corresponds to the information on the event. Techniques that can be used to recognize the classification ID number include the following. It may determine the date classification from the event information that is specified and input by the user and recognize the classification ID number from the determined date classification. If, for example, the event information relates to sports matches that take place in Athletic Ground B, it determines that the date classification to be "special day 2" and then recognizes the classification ID number to be "ID5" from the "special day 2". If the event information relates to the last day of five consecutive holidays, it recognizes the date classification to be "the last day of a long holiday" and the classification ID number to be "ID10" from the "last day of a long holiday". Then, it appropriately updates the calendar templates 20 on the basis of the date and the classification ID number it recognizes.

The timer 191 recognizes the current clock time typically from GPS on the basis of the reference pulse of an internal clock. Then, the timer 191 appropriately outputs clock time information on the current clock time it recognizes.

[Operation of Navigation Device]

Now, the operation of the navigation device 100 will be described by referring to the drawings.

(Calendar Template Modifying Process)

Figure 7:
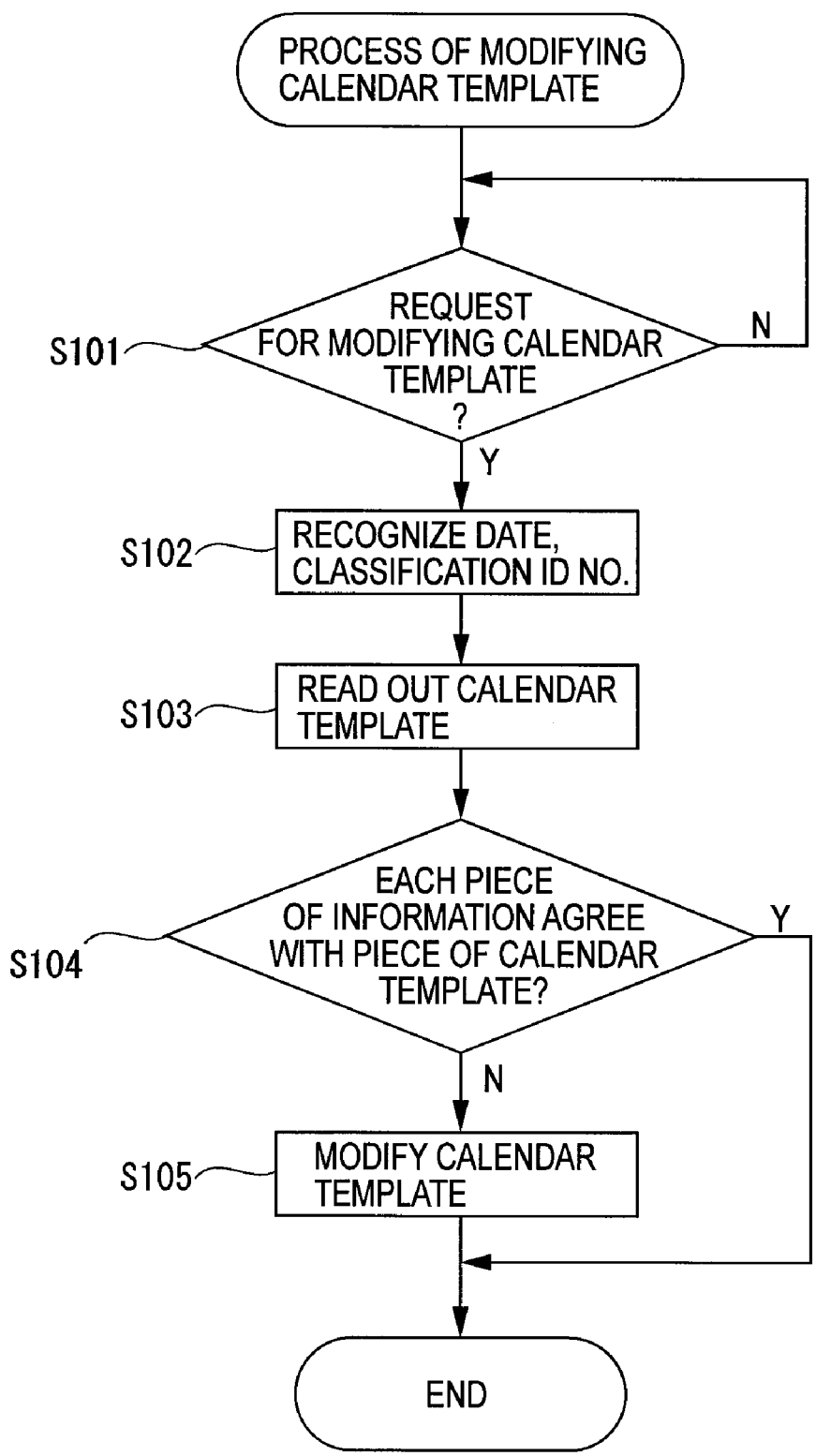
FIG. 7 is a flow chart of the operation of modifying a calendar template of the first embodiment.

Firstly, the calendar template 20 modifying process will be described by referring FIGS. 7 and 8 as an operation of the navigation device 100. Assume here that the user modifies a calendar template 20 as shown in FIG. 5 on the basis of the information he or she recognized from radio and/or TV broadcastings, printed information sources such as newspapers and/or official publications and/or acquired by connecting his or her mobile phone to the mobile phone line, telling that a festival will be held on 5th in City A. FIG. 7 is a flow chart of the operation of modifying a calendar template and FIG. 8 is a schematic conceptual illustration of the table structure of data in a calendar template as updated by the calendar modifying section.

Firstly, the user of the vehicle turns on the power source of the navigation device 100 to feed power to the device. As power is supplied to the device, the processor 180 controls the terminal display 140 and causes it to display a main menu and prompt the user to specify and input a specific operation of the navigation device 100.

Then, as shown in FIG. 7, the user operates the terminal input section 130 to specify an operation of modifying the calendar template 20. As the processor 180 recognizes by way of the calendar modifying section 190 the input specifying an operation of modifying the calendar template 20 (Step S101), it has the terminal display 140 display an image that prompts the user to specify and input a date and an event necessary for modifying the calendar template 20.

Thereafter, as the user specifies and inputs a date and an event by operating the terminal input section 130, following the instructions in the displayed image, the calendar modifying section 190 acquires the date and the event specified and input by the user. The user may specify and input a date and an event by entering characters or selecting them from a number of candidates being displayed on the terminal display 140. Alternatively, the user may specify and input a date and an event in a manner as described below. Firstly, the user selects a date by operating the terminal input section 130 and moving the flashing cursor being displayed in or around the area of a date in the calendar template 20 as shown in FIG. 5. Then, he or she inputs the event of the selected date by entering characters or by selecting one of the events being displayed on the terminal display 140.

As the calendar modifying section 190 acquires the date and the event, it operates to recognize the obtained information (Step S102). More specifically, it recognizes the specified date and the classification ID number that corresponds to the event. In the above-described instance, the calendar modifying section 190 recognizes that the date is 5th and determines that the date classification that corresponds to the event is "special day 1" which is a festival day of City A. Subsequently, it recognizes the classification ID number as "ID4" from the date classification it determined.

Thereafter, it reads out the calendar template 20 stored in the memory 170 (Step S103). Then, the calendar modifying section 190 determines if the information it recognizes in the Step S102 agree with the information contained in the calendar template 20 that is read out in the Step S103 or not (Step S104). More specifically, it recognizes the classification ID number that corresponds to the date it recognizes in the Step S102 from the read out calendar template 20. Then, it determines if the classification ID number recognized from the calendar template 20 and the classification ID number recognized in the Step S102 agree with each other or not.

If the calendar modifying section 190 determines in the Step S104 that the two classification ID numbers agree with each other, it does not modify the calendar template 20 and terminates the processing operation. If, on the other hand, it determines that the two classification ID numbers do not agree with each other, it modifies the calendar template 20 on the basis of the various pieces of information it recognized in the Step S102 (Step S105) and terminates the processing operation. More specifically, since the classification ID number of the 5th as recognized in the Step S102 is "ID4" and the classification ID number of the 5th as recognized from the calendar template 20 is "ID1", the calendar modifying section 190 modifies the classification ID number of the 5th from "ID1" to "ID4" and terminates the processing operation as shown in FIG. 8.

(Process of Searching for Traveling Route)

Figure 9:
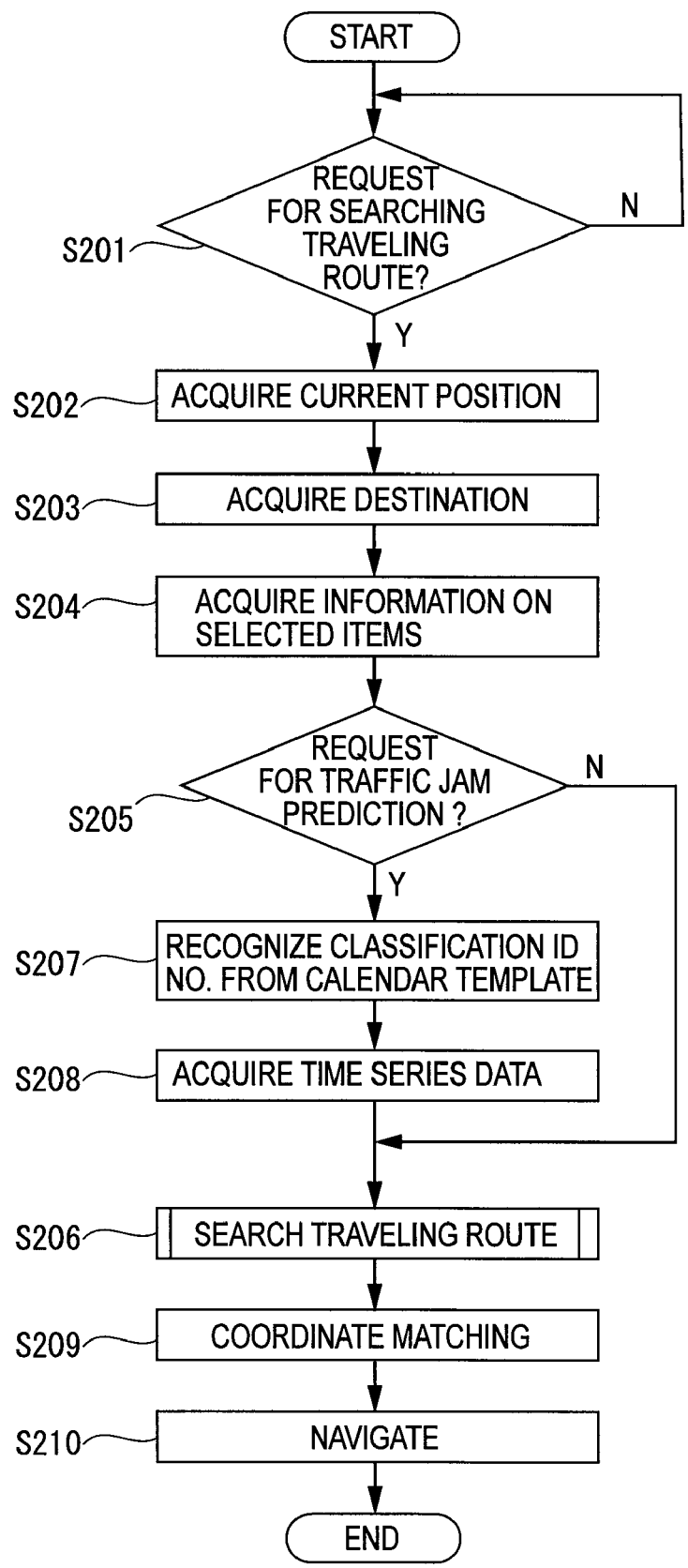
FIG. 9 is a flow chart of the operation of searching for a traveling route of the first embodiment.
Figure 10:
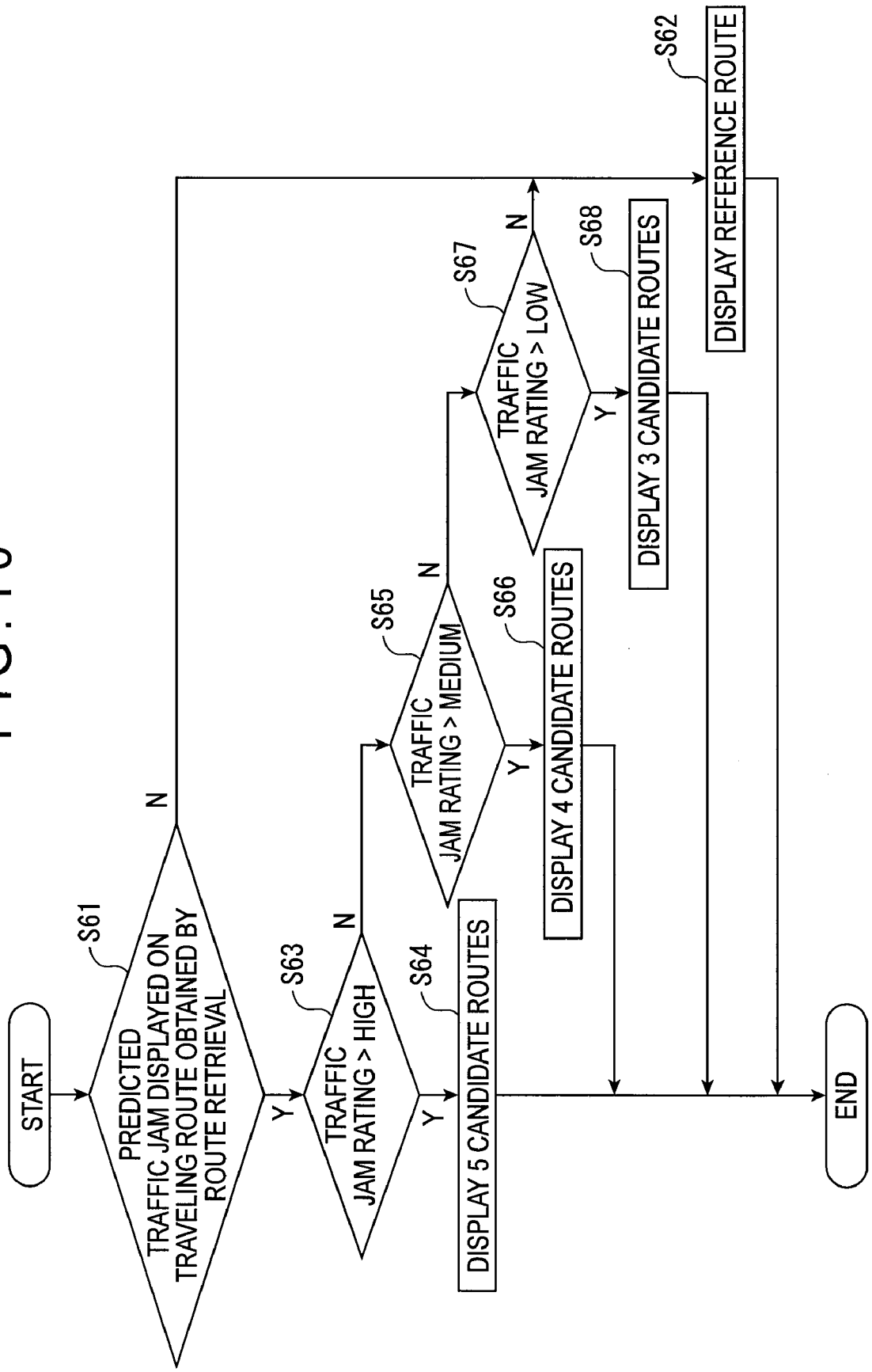
FIG. 10 is a flow chart of the operation of selecting the number of candidate traveling routes of the first embodiment.
Figure 11:
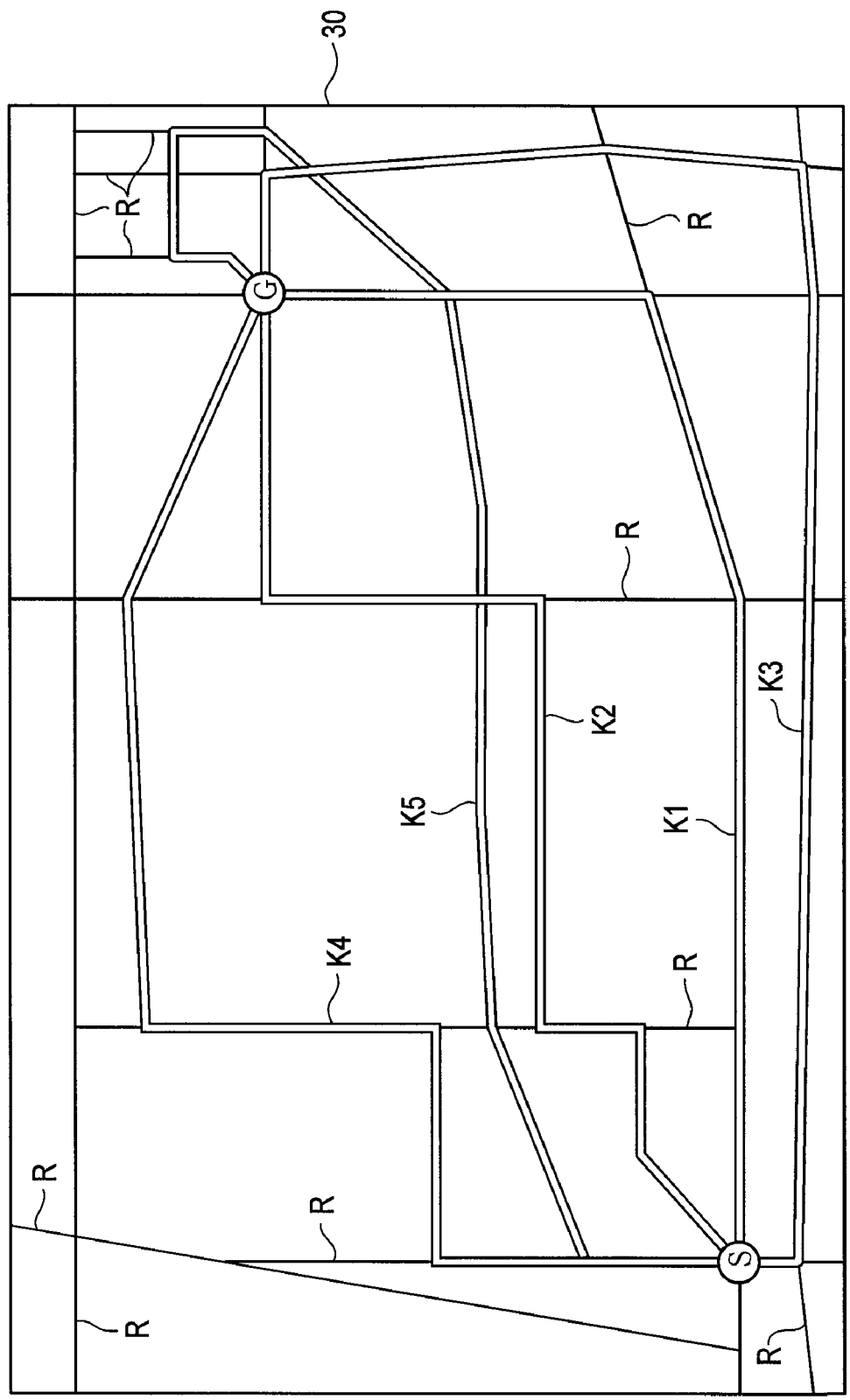
FIG. 11 is a schematic conceptual illustration of a displayed image notifying the narrowed down candidate traveling routes of the first embodiment.
Figure 12:
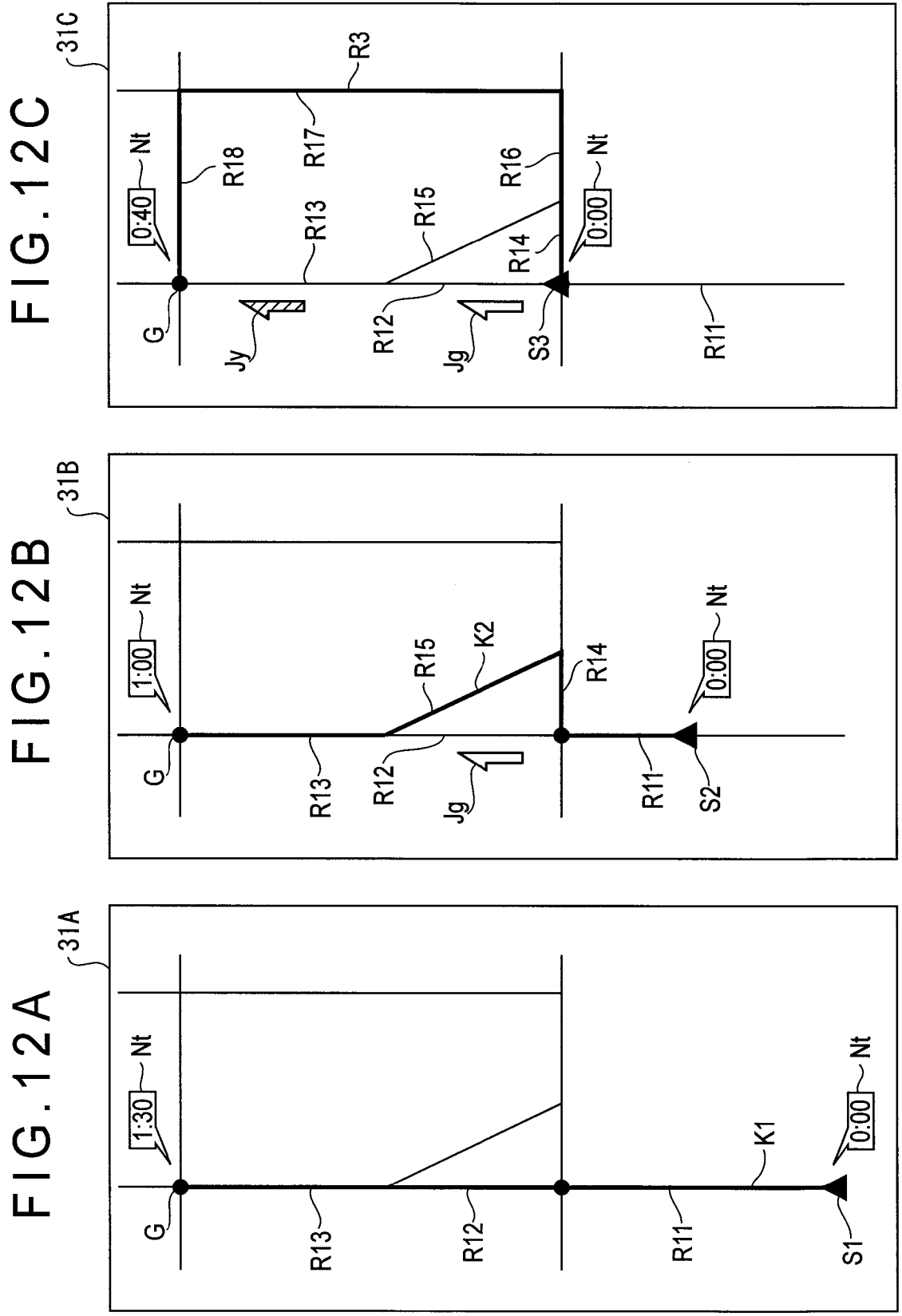

Now, the process of searching for the traveling route of the navigation device 100 will be described by referring to FIG. 9 through FIG. 12C. FIG. 9 is a flow chart of the operation of searching for a traveling route in the navigation device. FIG. 10 is a flow chart of the operation of selecting the number of candidate traveling routes in the traveling route searching operation. FIG. 11 is a schematic conceptual illustration of a displayed image notifying the narrowed down candidate traveling routes. FIGS. 12A through 12C are schematic illustrations of images of a traveling route that can be displayed on the screen. FIG. 12A is a schematic illustration of an image that can be displayed when the embodiment searches for a traveling route to a selected position. FIG. 12B is a schematic illustration of an image that can be displayed when the embodiment researches for a traveling route to the position when a predetermined time period has elapsed from FIG. 12A. FIG. 12C is a schematic illustration of an image that can be displayed when the embodiment re-searches for a traveling route to the position when a predetermined time period has elapsed from FIG. 12B.

Firstly, the user operates the terminal input section 130 to input a command for searching the traveling route of the vehicle as shown in FIG. 9. As the processor 180 recognizes the input of the command for searching the traveling route of the vehicle (Step S201), the processor 180 causes the terminal display section 140 to display an image prompting the user to enter various pieces of information necessary for searching the traveling route such as the destination, the shortest traveling distance, the shortest traveling time and necessity of predicting traffic jams.

Then, as the processor 180 recognizes the various pieces of information necessary for searching the traveling route, it has the current position recognizer 181 recognize the current position of the vehicle (Step S202) and the destination recognizer 182 recognize the specified and input destination (Step S203). More specifically, it acquires information on the current position of the vehicle by computationally determining the current position of the vehicle on the basis of the speed data and the azimuth data output respectively from the speed sensor and the azimuth sensor of the sensor 110 and the GPS data on the current position output from the GPS receiver by way of the current position recognizer 181. The acquired information on the current position is appropriately stored in the memory 170.

The processor 180 also controls the terminal display 140 to have it display an image that prompts the user to select and input the destination by operating the terminal input section 130. As the user inputs the destination in response to the prompt of the image, operating the terminal input section 130, the destination recognizer 182 acquires the information on the destination as input by the user. The acquired information on the destination is stored appropriately in the memory 170.

If the user requests to acquire information on the spot of the destination when inputting the destination by operating the terminal input section 130, he or she operates the terminal input section 130 so as to request retrieval information on the spot, seeing the image being displayed on the terminal display 140. In response to the request for retrieval information on the spot, the processor 180 hierarchically retrieves the mesh information of the lower layers for each area, typically using the map information MP and acquires the retrieval information correlated to the spot of the destination from the storage 160 by way of the information retriever 189. Then, the processor 180 controls the terminal display 140 to have it display the acquired retrieval information.

If the retrieval information requires to display map information of a predetermined area containing the destination or the user who recognizes the retrieval information operates the terminal input section 130 to display a predetermined area, the processor 180 appropriately controls the terminal display 140 so as to have it display the display mesh information VMx of the corresponding area. As the desired map information is displayed on the terminal display 140 in this way, the user identifies the destination by appropriately selecting and inputting the spot of the destination by means of the terminal input section 130, for example, by operating the cursor being displayed on the map image. As the spot is identified, the destination recognizer 182 of the processor 180 recognizes the spot of the destination and appropriately stores it in the memory 170.

Additionally, the processor 180 controls the terminal display 140 so as to have it display an image that prompt the user to select items that are requirements to be met when searching for the traveling route and input the selected items. As the user operates the terminal input section 130 to select and input the items in response to the prompt of the image being displayed, the processor 180 acquires information on the selected and input items (Step S204). The acquired information on the selected items is appropriately stored in the memory 170.

Thereafter, the processor 180 acquires the information on the selected items stored in the memory 170 by the route processor 188 and determines if the information on the selected items it acquires contains a request for prediction of traffic jams or not (Step S205).

If the processor 180 determines in the Step S205 by the route processor 188 that no request for prediction of traffic jams is contained, it acquires the VICS data output from the VICS receiver 120 by means of the traffic jam condition recognizer 187. Then, the processor 180 generates current traffic jam information of an area containing the current position and the destination from the obtained VICS data. The generated current traffic jam information is appropriately stored in the memory 170.

Then, the processor 180 has the route processor 188 acquire the current position, the destination, the selected items and the current traffic jam information from the memory 170. Then, it performs a route searching processing operation of searching for the traveling route of the vehicle from the current position to the destination, using the map information for searching the traveling route of the vehicle and the matching data MM stored in the storage 160 (Step S206).

More specifically, when the moving route involves only major roads for which sufficient data are accumulated in an organized manner, the processor 180 searches the moving route, simply using the map information for searching the traveling route of the vehicle. When, on the other hand, the moving route involves minor and narrow roads for which sufficient data are not accumulated, it searches the moving route, using the matching data MM for the minor road or each of the minor roads, until the minor road gets to a major road. When searching for the moving route, using the matching data MM, the processor 180 recognizes the condition of each of the roads on the basis of the related link L, determining if there are two nodes N that represent the same and identical spot or not by means of the coordinate matching section 186.

Then, the route processor 188 detects a plurality of candidate traveling routes and subsequently narrows down the candidate traveling routes to a fewer number of, e.g., 5, candidate traveling routes that meet most the requirements posed by the user on the basis of the information acquired for the selected items and the current traffic jam information. More specifically, when selecting the candidate traveling routes, the route processor 188 performs the operation of selecting the number of candidate traveling routes illustrated in FIG. 10. Referring to FIG. 10, the route processor 188 recognizes the presence or absence of traffic jam and the rating of the traffic jam, if any, on each of the five candidate traveling routes, for which traveling route information is generated, on the basis of the current traffic jam information (Step S61). VICS data may be used to recognize the rating of the traffic jam. To be more accurate, the route processor 188 recognizes the presence or absence of traffic jam on the basis of the degree of traffic jam and then recognizes the rating of the traffic jam, if any, on the basis of the degree of traffic jam, the length of traffic jam and the link traveling time information. For example, the traffic jam may be rated as "high", "medium", "low" or "very low" on the basis of the product of the length of traffic jam multiplied by the link traveling time, if the degree or length of traffic jam and the link traveling time are above respective threshold values or not and so on.

Then, if the route processor 188 determines in the Step S61 that there is no traffic jam, it selects the traveling route that meets the requirements of the user to the largest extent out of the candidate traveling routes and generates traveling route information. Thereafter, it generates traveling time information by determining the traveling time necessary for getting to the destination by way of the selected traveling route and causes the display controller 184 to have the terminal display 140 display the traveling route as reference route (Step S62). It may alternatively be so arranged that the display controller 184 has the terminal display 140 display the other candidate traveling routes if the user requests to do so by operating the terminal input section 130 so that the user may select any of the traveling routes. When displaying the other candidate traveling routes, it is preferable that the traveling time necessary for getting to the destination by way of each of the candidate traveling routes is also displayed.

If it is determined in the Step S61 that there are traffic jams on the five candidate traveling routes, the route processor 188 determines if the rating of each of the traffic jams is "high" or not on the basis of the current traffic jam information (Step S63). The traffic jam rating may be based on if the sum of the average of the products of multiplications, each of the products being the length of each of the traffic jams multiplied by the link traveling time on each of the candidate traveling routes, is greater than a predetermined threshold value or not. Besides the above-described technique of rating a traffic jam on the basis if the sum of the average of the products of multiplications, each of the products being the length of each of the traffic jams multiplied by the corresponding link traveling time on each of the candidate traveling routes, is greater than a predetermined threshold value or not, traffic jam rating techniques that can be used for the purpose of the present invention include one that is based only on if the degree of each traffic jam exceeds a predetermined threshold value or not, one based only on if the length of each traffic jam exceeds a predetermined threshold value or not, one based only on if each link traveling time exceeds a predetermined threshold value or not, one based on the sum of the products of multiplications, each of the products being each of the VICS links multiplied by the corresponding link traveling time, provided that the extent of any of the traffic jams exceeds the corresponding VICS link, one based only on if any one of traveling routes shows the traffic jam rating as "high" and one based on statistic traffic information other than VICS data.

If it is determined in the Step S63 that the traffic jams are rated as "high", the route processor 188 generates traveling time information by computing the traveling time necessary for getting to the destination each of the five candidate traveling routes. Thereafter, the route processor 188 causes the display controller 184 to have the terminal display 140 display the traveling route information for all the five candidate traveling routes (Step S64). The five candidate traveling routes may be identifiably superimposed on a route notifying display image 30 in different respective colors for instance, as shown in FIG. 11. Referring to FIG. 11, the five candidate traveling routes K1 through K5 connecting the current position S1 and the destination G are superimposed on the respective roads R in the notifying display image. Alternatively or additionally, the designations of predetermined points en route may be displayed in characters. Furthermore, some other display technique may alternatively be used. Then, one of the candidate traveling routes is selected by a route selecting input operation on the part of the user.

If, on the other hand, it is determined in the Step S63 that the traffic jams are not rated as "high", the route processor 188 determines if the traffic jams are rated as "medium" or not as in the Step S63 (Step S65). If it is determined that the traffic jams are rated as "medium", the route processor 188 selects four candidate traveling routes that meet most the requirements posed by the user out of the five candidate traveling routes and generates traveling time information by computing the traveling time necessary for getting to the destination for each of the four candidate traveling routes. Thereafter, the route processor 188 causes the display controller 184 to have the terminal display 140 display the traveling route information for all the four candidate traveling routes (Step S66). Then, one of the candidate traveling routes is selected by a route selecting input operation on the part of the user.

If it is determined in the Step S65 that the traffic jams are not rated as "medium", the route processor 188 determines if the traffic jams are rated as "low" or not as in the Step S63 and the Step S65 (Step S67). If it is determined that the traffic jams are rated as "low", the route processor 188 selects three candidate traveling routes that meet most the requirements posed by the user out of the five candidate traveling routes and generates traveling time information by computing the traveling time necessary for getting to the destination for each of the three candidate traveling routes. Thereafter, the route processor 188 causes the display controller 184 to have the terminal display 140 display the traveling route information for all the three candidate traveling routes (Step S68). Then, one of the candidate traveling routes is selected by a route selecting input operation on the part of the user.

If, finally, it is determined in the Step S67 that the traffic jams are not rated as "low", the route processor 188 determines that the traffic jams of the generated five candidate traveling routes are "very low" and proceeds to the Step S62 to cause the display controller 184 to have the terminal display 140 display the reference route.

If, on the other hand, the processor 180 determines in the Step S205 by means of the route processor 188 that a request for prediction of traffic jams is contained, it acquires the clock time from the timer 191 and recognizes the current date from the acquired clock time. Then, it acquires the related calendar template 20 from the memory 170 and recognizes the classification ID number of the date it recognized from the acquired calendar template 20 (Step S207). It also acquires information on the current position and the destination stored in the memory 170 and recognizes the current position and the destination. Then, the traffic jam condition recognizer 187 acquires the time series data 12$i$ that corresponds to the recognized classification ID number and contains the current position and the destination from the traffic jam prediction table 10 stored in the storage 160 (Step S208).

Thereafter, the processor 180 performs the processing operation of the Step S206. More specifically, the processor 180 generates current traffic jam information by means of the traffic jam condition recognizer 187 and stores it in the memory 170. Then, the processor 180 acquires information on the current position, the destination and the selected items from the memory 170 by means of the route processor 188. Then, it detects a plurality of candidate traveling routes on the basis of the acquired information and narrows them down to a fewer number of candidate traveling routes on the basis of the acquired information on the selected items to generate information on the candidate traveling routes that meet the requirements of the user.

Additionally, the processor 180 acquires the current traffic jam information from the memory 170 by means of the traffic jam condition recognizer 187 and the current time and day from the timer 191. Then, it determines the expected arrival time of getting to a selected point on each of the candidate traveling routes contained in the information on the candidate traveling routes generated by the route processor 188 on the basis of the current traffic jam information and the current time and day it acquires. Then, the traffic jam condition recognizer 187 predicts the traffic jam on each of the candidate traveling routes at the expected arrival time of getting to the selected point on the basis of the time series data 12$i$ acquired in the Step S208 and generates traffic jam prediction information on the condition of each of the predicted traffic jams.

Then, the processor 180 narrows down the candidate traveling routes in the candidate traveling route information to a fewer number of candidate traveling routes by means of the route processor 188 on the basis of the current traffic jam information and the traffic jam prediction information, using the operation of selecting the number of candidate traveling routes as described above by referring to FIG. 10. The operation of selecting the number of candidate traveling routes may alternatively be performed only on the basis of the traffic jam prediction information. Then, as described above, the route processor 188 determines the traveling time necessary for getting to the destination by each of the candidate traveling routes in the traveling route information to generate traveling time information. Then, the processor 180 operates the display controller 184 so as to have the terminal display 140 display the information on the computationally determined candidate traveling route(s). If the terminal display 140 displays not a reference route but a plurality of routes, the terminal display 140 also displays an image prompting the user to select one of the candidate traveling routes. The traveling route is defined when the user selects and inputs one of the candidate traveling routes.

Thereafter, the processor 180 acquires matching data MM from the storage 160. Then, it has the coordinate matching section 186 perform a coordinate matching processing operation on the acquired matching data MM (Step S209) and recognizes the condition of the roads of the selected traveling route or how the roads are connected. Then, it appropriately stores the condition of the roads in the memory 170. Additionally, the processor 180 controls the terminal display 140 by means of the display controller 184 so as to have it superimpose an icon that indicates the current position of the vehicle on the acquired map information on the basis of the information on the current position and also the traveling route selected by the user, the traffic jam prediction information, the expected traveling time and the current traffic jam information, while it has the voice output section 150 appropriately output a voice for guiding the user (Step S210).

Assume here that the processing operations of the Steps S201 through S210 are performed and no traffic jam takes place currently on the roads that connect the current position S1 and the destination G with the shortest distance, while no traffic jam is predicted at any position on the traveling route for getting to the destination G. In such a situation, the traveling route K1 is superimposed on the roads R11, R12 and R13 that connect the current position S1 and the destination G with the shortest distance on the basis of the traveling route information and the traveling time marks Nt are superimposed at respective positions near the current position S1 and near the destination G on the basis of the traveling time information as shown in the guidance display image 31A of FIG. 12A. It will be appreciated that an image as shown in FIG. 12A is displayed when the processing operations of the Steps S201 through S206 and S209 are performed and no traffic jam is currently taking place on the roads that connect the current position S1 and the destination G with the shortest distance. The traveling time marks Nt as shown in FIG. 12A indicate that the traveling time to the destination G is one hour and thirty minutes.

Subsequently, the processor 180 recognizes the running condition of the vehicle on the basis of the data output from the speed sensor, the azimuth sensor and the acceleration sensor of the sensor 110 and the GPS data output from the GPS receiver. Additionally, the processor 180 notifies the user of guidance information by the guidance providing section 183 for guiding the travel of the vehicle that is generated on the basis of the outcome of the processing operation of the Step S210, which is the recognized moving condition of the vehicle, and the route guidance information contained in the traveling route information. The guidance information is provided to the user by way of the terminal display and/or in voice.

More specifically, the display controller 184 of the processor 180 connects the nodes N in the matching mesh information MMx acquired from the storage 160 by means of a poly-line and performs a poly-line processing operation on the basis of the structure of each of the roads as described in the link string block information of the matching data MM so as to have the terminal display 140 display the roads in the area of the matching mesh information MMx that contains the traveling route. Additionally, the display controller 184 has the terminal display 140 superimpose the name information VMxA and the background information VMxC that are miscellaneous elemental data of the map other than the roads in the area of the display mesh information VMx acquired from the storage 160, which corresponds to the matching mesh information MMx. Then, the current position of the vehicle is superimposed on the map that is being displayed.

When superimposing the current position on the map, a map matching processing operation is performed on the basis of the matching data MM so that the current position of the vehicle as indicated by a mark that is superimposed on the map being displayed may not be displaced from the road in the displayed map. In other words, the processor 180 appropriately corrects the current position information in such a way that the current position of the vehicle as displayed on the terminal display 140 is found on the matching data MM of the traveling route and hence on the link string of links L. Thus, the processor 180 superimposes the current position of the vehicle on the map to guide the user. When the current position gets to the predetermined position, it provides guidance in the above-described manner by displaying it and/or in voice. While a coordinate matching processing operation is performed at the time of acquiring the matching data MM in the Step S209 in the above description, the coordinate matching processing operation may alternatively be performed at the time of or before performing the map matching processing operation.

When the terminal input section 130 is operated to display a map of an area other than the above area for viewing, the map will be displayed by way of a retrieval operation as described above along with the display mesh information VMx acquired from the storage 160.

While the vehicle is moving, the processor 180 acquires VICS data on traffic jams, traffic accidents, road construction works, traffic control operations and meteorological information by way of the traffic condition recognizer 187. Then, if the moving condition of the vehicle can be influenced and it can be forced to alter the traveling route according to the VICS data and the meteorological information acquired by way of the traffic jam condition recognizer 187, the processor 180 repeats the processing operation of searching for the traveling route. In other words, the processor 180 performs a rerouting processing operation. Additionally, the processor 180 notifies the user of the influence or provides the user with guidance that reflects the influence by means of the guidance providing section 183. In the rerouting processing operation again, the candidate traveling routes obtained by computational operations are narrowed down to a fewer number of candidate traveling routes by using the operation of selecting the number of candidate traveling routes as described above by referring to FIG. 10.

While the number of candidate traveling routes to be displayed on the terminal display 140 is selected on the basis of the traffic jam rating of each of the computationally obtained candidate traveling routes in the above-described rerouting processing operation, the number of candidate traveling routes may alternatively be selected on the basis of the rating of the traffic jam that occurred on the current traveling route while the vehicle is traveling. Still alternatively, the number of candidate traveling routes may be selected on the basis of both the traffic jam rating of each of the candidate traveling routes and the rating of the traffic jam that occurred on the current traveling route while the vehicle is traveling.

Assume here now that the traffic jam condition recognizer 187 recognizes that a traffic jam is taking place on the road R12 as a result of the processing operations of the Steps S201 through S209 but no traffic jam is predicted to take place at the selected point on the way to get to the destination G. Then, in such a situation, the traveling route K2 is superimposed on the roads R11, R14 and R15 on the basis of the traveling route information and the traveling time marks Nt are superimposed on the map at respective positions near the current position S2 and near the destination G on the basis of the traveling time information, while the current traffic jam mark Jg is superimposed at a position near the road R12 on the basis of the current traffic jam information as shown in the guidance display image 31B of FIG. 12B. An hour, or "1:00", is displayed for the traveling time from the current position S2 to the destination G. It will be appreciated that an image as shown in FIG. 12B is displayed when the processing operations of the Steps S201 through S206 and S209 are performed and a traffic jam is currently taking place on the roads R12.

Assume now that subsequently the processing operations of the Steps S201 through S209 are performed and the traffic jam condition recognizer 187 recognizes that the traffic jam on the road R12 is not dissolved yet, while it is predicted that a traffic jam will occur on the road R13 before the vehicle gets to the destination G. In such a situation, the traveling route K3 is superimposed on the roads R14, R16, R17 and R18 on the basis of the traveling route information and the traffic jam prediction mark Jy is superimposed near the road R13 on the basis of the traffic jam prediction information, while the traveling time marks Nt are superimposed at respective positions near the current position S3 and near the destination G on the basis of the traveling time information, while the current traffic jam mark Jg is superimposed at a position near the road R12 on the basis of the current traffic jam information as shown in the guidance display image 31C of FIG. 12C. Forty minutes, or "0:40", is displayed for the traveling time from the current position S3 to the destination G.

[Advantages of First Embodiment]

As described above in detail, the first embodiment acquires map information, current position information or information on the current position of the vehicle, destination information or information on the destination of the traveling vehicle and VICS data or traffic information on the traffic condition of the traveling route of the vehicle including traffic jam information and recognizes the traffic jam rating, or the extent of trouble that may be produced by the traffic jam, of each traveling route searched by the route processor 188, using map information on the basis of current position information and destination information. Then, the number of candidate traveling routes is increased as a function of traffic jam rating. More specifically, only a reference route is notified when the traffic jam rating is "very low" and three candidate traveling routes are notified when the traffic jam rating is "low", whereas four candidate traveling routes are notified when the traffic jam rating is "medium" and five candidate traveling routes are notified when the traffic jam rating is "high". Therefore, the number of candidate traveling routes from which the user can select the actual traveling route is increased as the traffic jam rating rises in order to accommodate a situation where secondary traffic jams can take place on any candidate traveling route so that it is possible to provide the user with useful traveling route information and appropriate guidance. Additionally, if this system is widely used by a large number of users, the traveling routes selected by the users (drivers) will show dispersions to consequently suppress possible secondary traffic jams as the number of candidate traveling routes that are notified to the user increases.

This embodiment generates traffic jam prediction information on the basis of a traffic jam prediction table 10 that is prepared by statistically processing past traffic conditions in terms of temporal elements to provide statistic traffic information and selects the number of candidate traveling routes that are notified to the user on the basis of the traffic jam rating predicted for each candidate traveling route. In other words, the number of candidate traveling routes to be notified to the user is increased as a function of the rating of the predicted traffic jam. With this arrangement, as in the case of narrowing candidate traveling routes on the basis of the current traffic jam of the current traveling route, it is possible to provide the user with useful traveling route information and appropriate guidance. Particularly, it is possible for the user to select a suitable traveling route, reliably avoiding traffic jams, and obtain useful guidance when candidate traveling routes are narrowed on the basis of predicted traffic jam information Furthermore, the embodiment recognizes the overall traffic jam rating on the basis of the traffic jam rating of each of a plurality of candidate traveling routes and selects the number of candidate traveling routes to be notified to the user on the basis of the overall traffic jam rating. With this arrangement, it is possible to select with ease the number of candidate traveling routes to be notified to the user without complex computations.

Additionally, the embodiment narrows candidate traveling routes on the basis of the information on the selected items and then further on the basis of the traffic jam rating. In other words, the number of candidate traveling routes for each of which the embodiment needs to recognize the traffic jam rating is very limited. Thus, the load of computations of the embodiment is reduced to improve the processing efficiency.

Still additionally, the traveling time to the destination is computed for each of the candidate traveling routes, the number of which is reduced. Thus, the operation of computing the traveling time of each of the candidate traveling routes is less wasted if compared with an arrangement where the traveling time of each of a large number of candidate traveling routes is computed and subsequently the candidate traveling routes are narrowed to a fewer number. In other words, the time required for the computations is reduced and the user is notified of timely and useful information and hence the processing efficiency is improved.

Furthermore, only a reference route that meets the requirements of the user most is displayed when the embodiment recognizes that no traffic jam is found or the rating of the traffic jam, if any, is very low. Then, the user is not required to select one of a plurality of candidate traveling routes to a great convenience on the part of the user.

Additionally, traffic jam prediction information is generated by means of a traffic jam prediction table 10 that contains statistic traffic information obtained by statistically processing past traffic conditions. Therefore, the load of the processing operation is small if compared with an arrangement where traffic jams are predicted by means of a specifically designed simulation program so that predicted traffic jams can be computationally determined quickly for a clock time after the elapse of a predetermined time from the current clock time. In other words, the user can be quickly notified of the transition of the traffic jam on the traveling route ahead on the basis of the predicted traffic jams and hence can be comfortably navigated.

Additionally, calendar templates 20 are provided and the traffic jam prediction table 10 is correlated with the dates of each of the calendar templates 20. More specifically, the calendar templates 20 are made to show a table structure where each calendar date is correlated with a classification ID number that corresponds to a date classification ID11 of the traffic jam prediction table 10 and is modifiable. With this arrangement, traffic jams can be reliably predicted by using the traffic jam prediction table 10 that is formed by using past data so that the user can be comfortably navigated. Additionally, as pointed out above, each calendar date of the calendar templates 20 is correlated with a classification ID number that corresponds to the traffic jam prediction table 10 and is modifiable. Therefore, if the predicted traffic condition and the current traffic condition show discrepancies, it is only necessary to change the classification ID number that corresponds to the time series data of the traffic jam prediction table to correspond to the current situation so that it is possible to predict traffic jams reliably.

[Second Embodiment]

Now, the second embodiment of the present invention will be described by referring to the accompanying drawings. This embodiment of navigation system is a telecommunication type navigation system for navigating the driver of a moving body, or a vehicle, in response to the moving condition thereof. However, it should be noted that a navigation system according to the present invention is not necessarily arranged in a vehicle. Like the first embodiment, it can be arranged in any moving body in order to notify the driver of the moving body of the traffic condition thereof.

Figure 13:
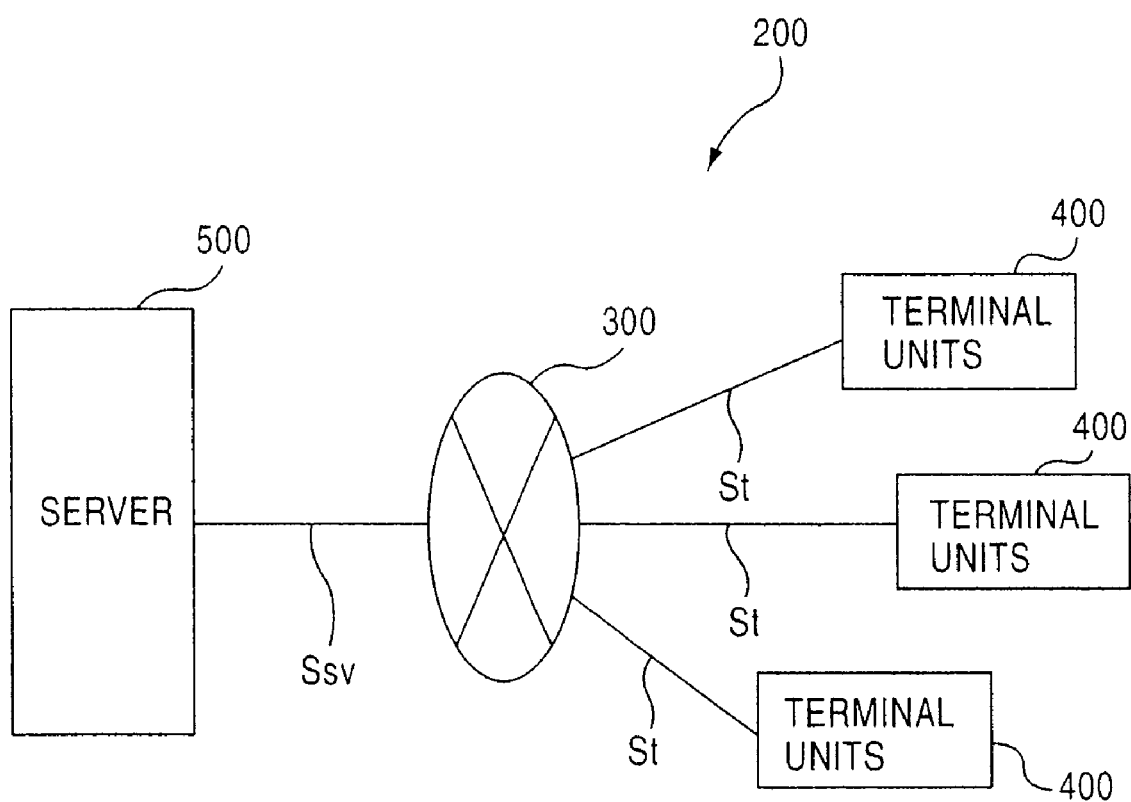
FIG. 13 is a schematic block diagram of a second embodiment of navigation system according to the present invention, showing the configuration thereof.
Figure 14:
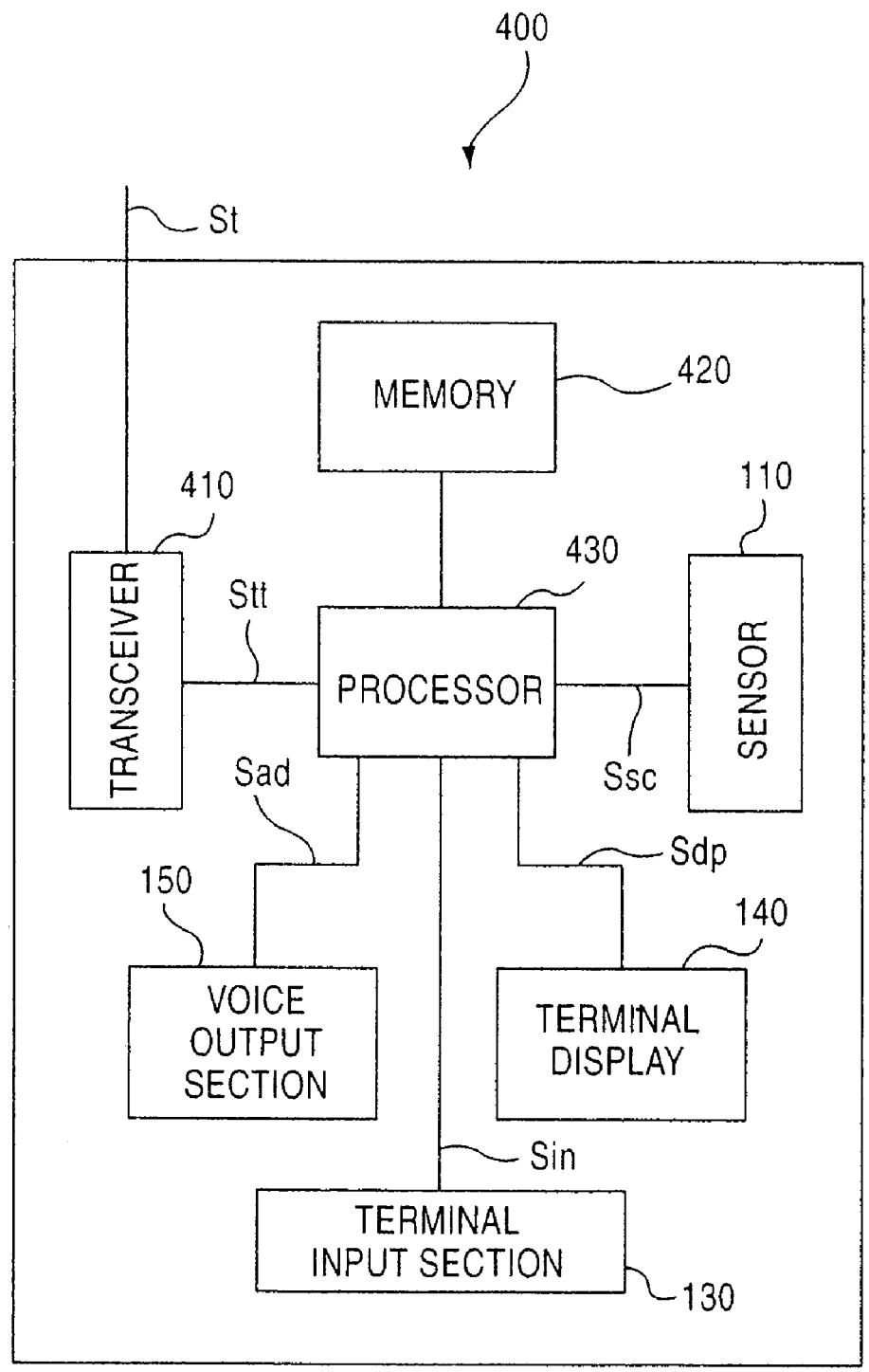
FIG. 14 is a schematic block diagram of a terminal unit of the second embodiment.
Figure 15:
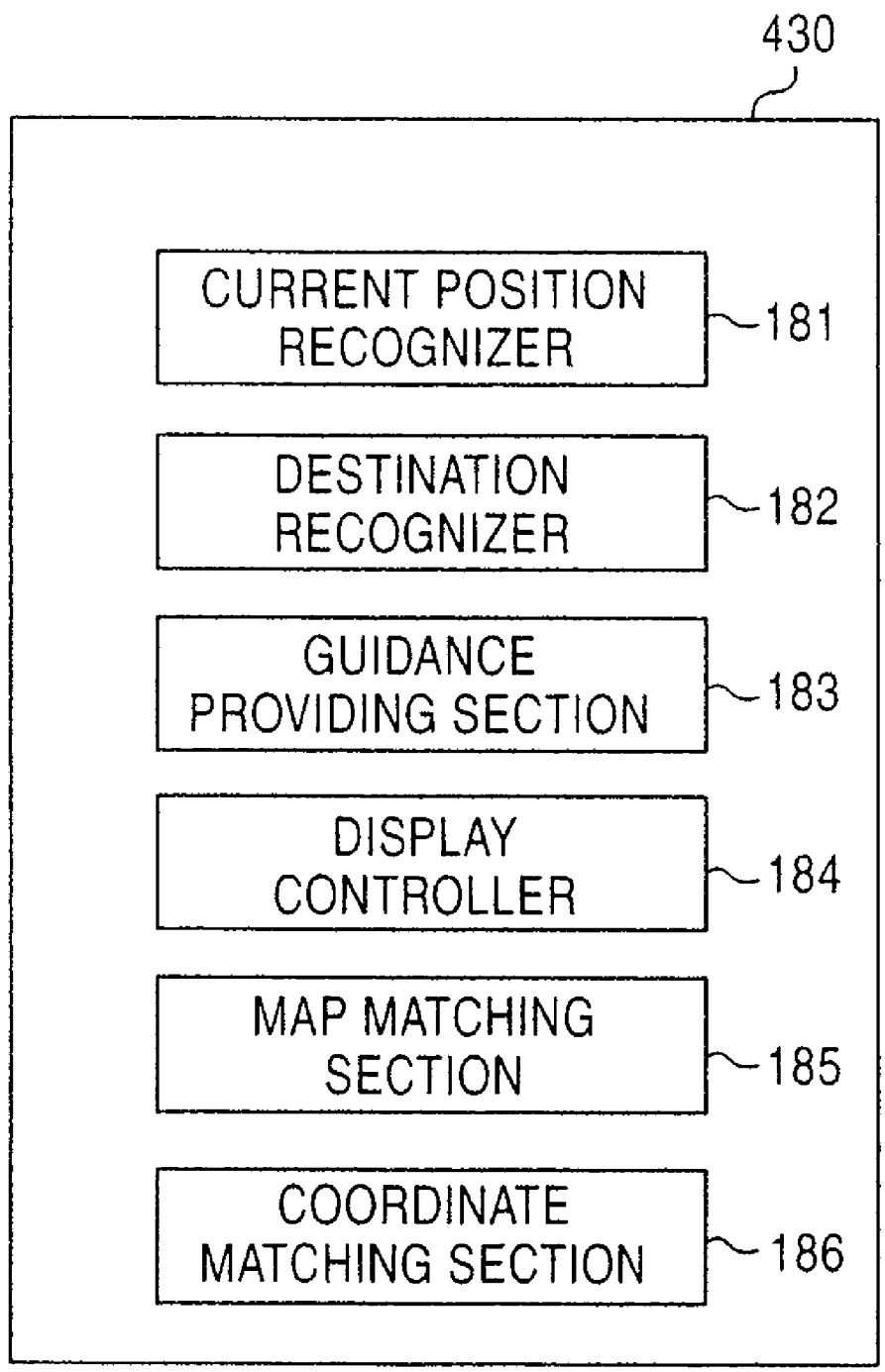
FIG. 15 is a schematic block diagram of a processor of the terminal unit of the second embodiment.
Figure 16:
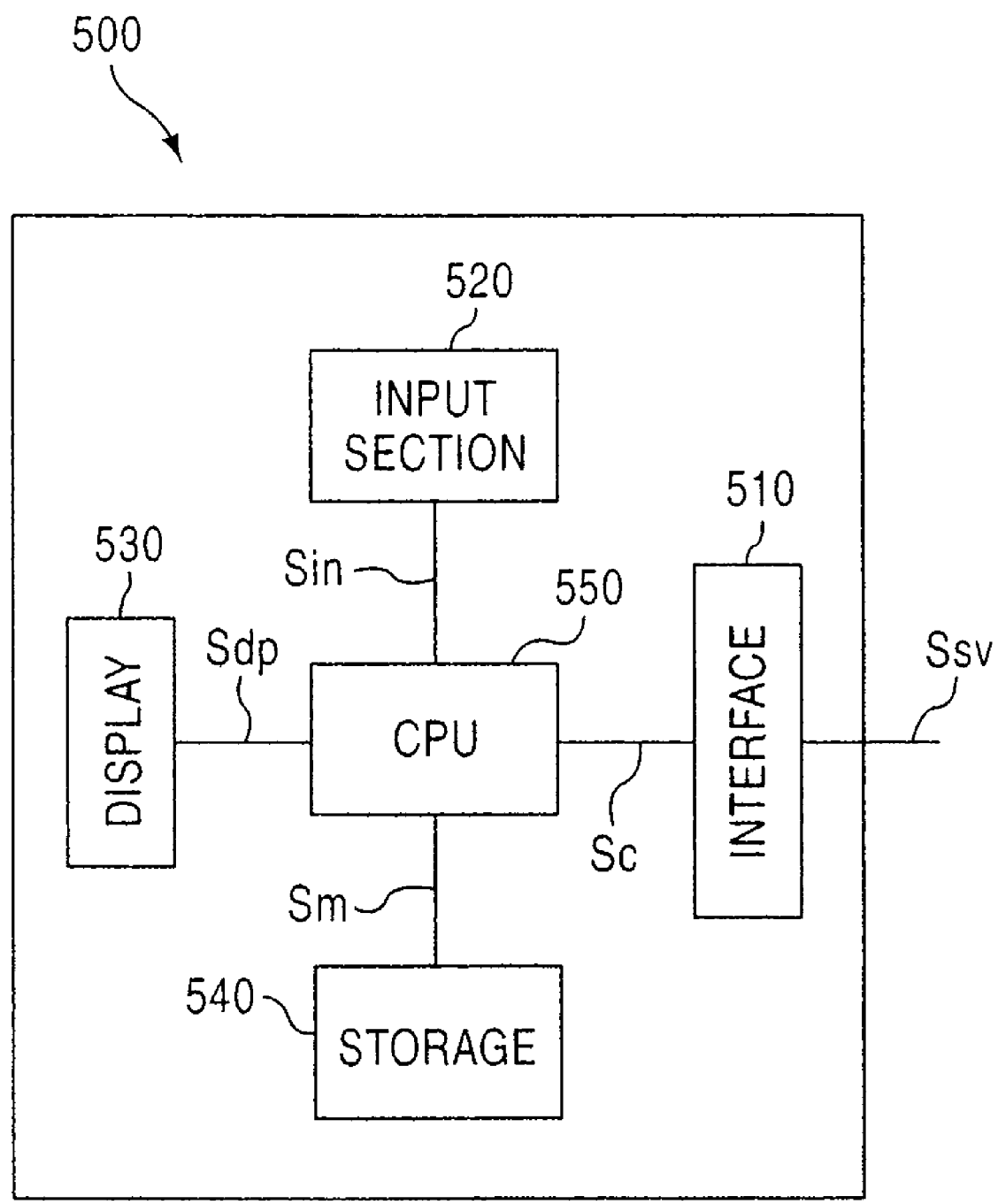
FIG. 16 is a schematic block diagram of a server of the second embodiment.
Figure 17:
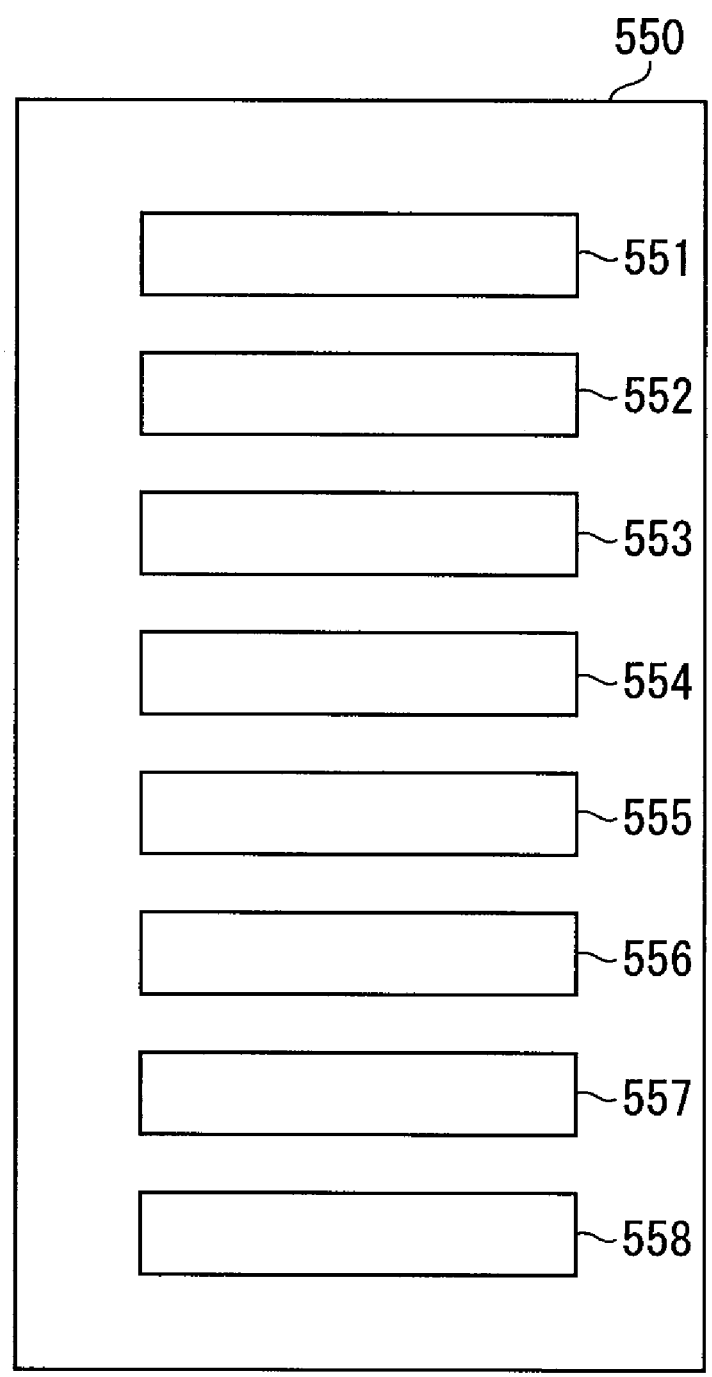
FIG. 17 is a schematic block diagram of a CPU of the server of the second embodiment.

FIG. 13 is a schematic block diagram of the second embodiment of navigation system according to the present invention, showing the configuration thereof. FIG. 14 is a schematic block diagram of a terminal unit. FIG. 15 is a schematic block diagram of the processor of the terminal unit. FIG. 16 is a schematic block diagram of a server. FIG. 17 is a schematic block diagram of a CPU of the server. In the drawings, the components same as those of the first embodiment are denoted respectively by the same reference symbols and will not be described any further.

[Configuration of Navigation System]

In FIG. 13, reference symbol 200 denotes a telecommunication type navigation system that is a traffic condition notifying device. The navigation system 200 is adapted to navigate the user of the vehicle, or the moving body in response to the moving condition of the vehicle. However, for the purpose of the present invention, a moving body is not limited to a vehicle and may alternatively be an aircraft or a ship. The navigation system 200 includes a network 300, terminal units 400 that operate as traffic condition notifying devices and a server 500.

The network 300 is connected to the terminal units 400 and the server 500. The network 300 is adapted to connect the terminal units 400 and the server 500 so that they can exchange information with each other. Examples of networks that can be used for the network 300 include the Internet adapted to operate on the basis of a general purpose protocol such as TCP/IP, intranets, LANs (local area networks), networks formed by a plurality of base stations that can exchange information through wireless mediums such as telecommunication networks and broadcasting networks and wireless mediums per se that can be used for the terminal units 400 and the server 500 to directly exchange information. For the purpose of the present invention, wireless mediums include electric waves, light, sound waves and electromagnetic waves.

Like the navigation device 100 of the first embodiment, each of the terminal units 400 may be realized in the form of a vehicle-mounted type device to be mounted in a vehicle, a portable type device, a PDA (personal digital assistant), a portable phone, a PHS (personal handyphone system), a portable personal computer or the like. Each of the terminal units 400 acquires map information delivered from the server 500 via the network 300 and searches for information on the current position and the destination of the vehicle on the basis of the map information it has. It also searches for and displays the route to the destination as well as a predetermined store that is located in the vicinity of the current position of the vehicle so as to operate as landmark along with the services the store provides. As shown in FIG. 14, each of the terminal units 400 includes a transceiver 410 that operates as terminal communication section, a sensor 110, a terminal input section 130, a terminal display 140, a voice output section 150, a memory 420, a processor 430 and so on.

The transceiver 410 is connected to the server 500 via the network 300 and also to the processor 430. The transceiver 410 is adapted to receive terminal signal St from the server 500 via the network 300 and, upon receiving the terminal signal St, it performs an input interface processing operation that is predefined to acquire a terminal signal St and outputs it as a processed terminal signal Stt to the processor 430. The transceiver 410 is also adapted to receive a processed terminal signal Stt from the processor 430 and, upon receiving the processed terminal signal Stt, it performs an output interface processing operation that is predefined to transmit it to the server 500 via the network 300 as terminal signal St.

The sensor 110 detects the moving condition of the vehicle on which it is mounted, including the current position and the running condition of the vehicle, and outputs signal Ssc of a predetermined format that represents the moving condition to the processor 430.

The terminal input section 130 typically includes various operation buttons and operation knobs (not shown) to be used by the vehicle user for input operations. The operation buttons and the operation knobs are used to specify operations of the terminal units 400. More specifically, they may be used to execute instructions for telecommunication, requesting to acquire information via the network 300, to specify the type of information to be acquired and/or the requirements to be met for acquiring information, to specify the destination, to retrieve information and to cause the running condition, or the moving condition of the moving body, to be displayed on the terminal display. In response to an operation of the user, the terminal input section 130 outputs a predetermined signal Sin to the processor 430.

The terminal display 140 is controlled by the processor 430 and adapted to display images for signal Sdp from the processor 430. Images that are displayed on the terminal display 140 include map information and images of retrieval information transmitted from the server 500.

The voice output section 150 is controlled by the processor 430 and outputs voices for the purpose of notification for various signals Sad from the processor 430 including those for voice data.

The memory 420 appropriately stores various information acquired via the network 300, which may be information on specified items that are input at the terminal input section 130, music data and/or image data. The memory 420 also stores various programs to be developed on the OS (operating system) of the terminal unit 400 that controls the operation of the entire terminal unit 400. The memory 420 may alternatively include a drive or a driver for readably storing data on a recording medium such as HD (hard disk) or optical disk.

The processor 430 has various input/output ports (not shown) including a telecommunication port connected to the transceiver 410, a GPS reception port connected to a GPS receiver of the sensor 110, sensor ports connected to respective various sensors of the sensor 110, a key input port connected to the terminal input section 130, a display control port connected to the terminal display 140, a voice control port connected to the voice output section 150 and a memory port connected to the memory 420. As shown in FIG. 15, the processor 430 has as various programs a current position recognizer 181 which operates as current position acquirer, a destination recognizer 182 which operates as destination information acquirer, a guidance providing section 183, a display controller 184, a map matching section 185 and a coordinate matching section 186.

The current position recognizer 181 recognizes the current position of the vehicle. The information acquired by the current position recognizer 181 is appropriately stored in the memory 420.

The destination recognizer 182 typically acquires destination information on the destination of the vehicle as selected and input by the user by operating the terminal input section 130 and recognizes the position of the destination. The destination information recognized by the destination recognizer 182 is appropriately stored in the memory 420.

The guidance providing section 183 provides guidance for driving the vehicle to support the user on the basis of the information on the traveling route and the information on the map guidance acquired in advance in response to the running condition of the vehicle and stored in the memory 420.

The map matching section 185 operates for map matching processing necessary for displaying the current position of the vehicle as recognized by the current position recognizer 181 based on the map information obtained from the server 500.

The coordinate matching section 186 operates for coordinate matching processing necessary for determining if the pieces of information on two nodes N contained in the matching data MM of the map information obtained from the server 500 as spot information indicate the same and identical spot or not.

The server 500 is adapted to exchange information with the terminal units 400 via the network 300. The server 500 is also adapted to acquire various pieces of information from other servers (not shown) of various governmental administration offices such as Meteorological Agency and Metropolitan Police Department, civil organizations, VICS and enterprises via the network 300. Pieces of information it acquires include meteorological information, VICS data on traffic jams, traffic accidents, road construction works, traffic control operations and so on and shop information on various stores and shops including gas stands and restaurants as well as other information that can be utilized for moving vehicles. As shown in FIG. 16, the server 500 includes an interface 510, an input section 520, a display 530, a storage 540, a CPU (central processing unit) 550 and so on.

The interface 510 performs a predetermined input interface processing operation on the server signal Ssv input to it via the network 300 and outputs the processed signal to the CPU 550 as processing server signal Sc. Additionally, as a processing server signal Sc to be transmitted from the CPU 550 to the terminal units 400 is input to it, the interface 510 performs a predetermined output interface processing operation on the processing server signal Sc that is input to it and outputs the processed signal to the terminal units 400 via the network 300 as server signal Ssv. It may be so arranged that the server signal Ssv is output only to a predetermined terminal unit 400 according to the information contained in the processing server signal Sc.

Like the terminal input section 130, the input section 520 typically includes a keyboard or a mouse as well as various operation buttons and operation knobs (not shown) to be used by the vehicle user for input operations. The operation buttons and the operation knobs are used to specify operations of the server 500, to specify and input information to be stored in the storage 540 and to update the information stored in the storage 540. In response to an operation of the vehicle user for specifying and inputting items, the input section 520 outputs a predetermined signal Sin to the CPU 550 to specify and input the items. In addition to or in place of the operation buttons and the operation knobs, the input section 520 may include a touch panel that may be arranged at the display 530 for input operations and a voice input section.

Like the terminal display 140, the display 530 is controlled by the CPU 550 and adapted to display images for signal Sdp from the CPU 550. Images that are displayed on the terminal display 140 include those retrieved from the storage 540 and those acquired from external servers via the network 300.

The storage 540 readably stores various pieces of information received from the terminal units 400 or external servers such as map information for maps as shown in FIGS. 2 and 3 and a traffic jam prediction table 10 as shown in FIG. 4. The storage 540 also readably stores calendar templates 20 correlated to each of the terminal units 400 that are connected to the server 500 via the network 300 as shown in FIG. 5. More specifically, although not shown in figures, the storage 540 has various information storage areas for storing various pieces of information, a map information storage area that operates as map information storage for storing map information, a traffic jam prediction table storage area that operates as statistic traffic information storage for storing a traffic jam prediction table 10 and a calendar storage area for storing calendar templates 20.

While the storage 540 has four storage areas in the above description, this embodiment is by no means limited thereto. In other words, the storage 540 may not have such storage areas or may have additional storage areas. The storage 540 may include drives or drivers for readably storing data on storage mediums such as HDs (hard disks), DVDs (digital versatile disks), optical disks and memory cards. It is also adapted to store the information input by operating the input section 520 and update the information input by operating the input section 520 and stored in it. The storage 540 additionally stores various programs to be developed on the OS (operating system) of the navigation system 200 that controls the operation of the entire server 500 and the entire navigation system 200.

The storage 540 stores retrieval information necessary for acquiring information on a predetermined spot on a map as map information. More specifically, retrieval information in response to the request on the retrieval sent from the terminal unit 400 include information on the designations of prefectures, cities, towns, villages, districts and areas that are used to pinpoint a spot, guidance information and information on shops that are also used to pinpoint a spot. Retrieval information is stored to show a table structure where pieces of information on items are arranged hierarchically in the form of a tree structure.

The storage 540 additionally stores personal information relating to the users of the navigation system 200 who utilize the navigation system 200 by using any of the terminal units 400. Personal information may include the name and the address of each user and the ID number and the password assigned to each user as well as the type of each of the terminal units 400 that is used when utilizing the navigation system 200 and the address number of each of the terminal units 400 that is used for transmitting information to and receiving information from the terminal unit 400. Additionally, the storage 540 stores various pieces of information to be used for performing navigation processing operations that are readable to the CPU 550.

As shown in FIG. 17, the CPU 550 has as various programs stored in the storage 540 a map output section 551, a VICS data acquirer 552 that operates as traffic information acquirer, a traffic jam condition recognizer 553 that operates also as traffic condition transition recognizer, a server coordinate matching section 554, a route processor 555 that operates as traveling condition recognizer, an information retriever 556, a calendar modifying section 557, a timer 558 and so on.

The map output section 551 is adapted to respond to information requesting delivery of information relating the map information contained in the processing server signal Sc input to it. Then, it retrieves the requested information from the map information stored in the storage 540, e.g., display data VM and matching data MM that correspond to a predetermined area, and reads it out as memory signal Sm. Then, it converts the memory signal Sm it reads out into processing server signal Sc and outputs it to selected ones or all of the terminal units 400 via the interface 510 and the network 300 according to the processing server signal Sc so as to deliver the requested information of the map information.

Like the VICS receiver 120 of the first embodiment, the VICS data acquirer 552 acquires VICS data from the VICS (not shown) on the basis of the input processing server signal Sc and according to the information relating to a request for searching the traveling route as contained in the processing server signal Sc.

The traffic jam condition recognizer 553 generates current traffic jam information as memory signal Sm from the VICS data acquired by way of the VICS data acquirer 552 on the basis of the input processing server signal Sc and according to the information relating to a request for searching the traveling route as contained in the processing server signal Sc. Additionally, like the traffic jam condition recognizer 187 of the first embodiment, the traffic jam condition recognizer 553 of this embodiment performs a processing operation to generate traffic prediction information as memory signal Sm on the basis of the input processing server signal Sc and according to the information relating to a request for searching the traveling route, taking the traffic jam information and the predicted traffic jams as contained in the processing server signal Sc into consideration. Then, it appropriately converts the generated memory signal Sm into a processing server signal Sc and outputs it to selected ones or all of the terminal units 400 via the interface 510 and the network 300 according to the processing server signal Sc so as to notify the current traffic jam condition and the predicted traffic jams that will take place to any of the related vehicles that are provided with a terminal unit 400 before the vehicle gets to the destination.

Like the coordinate matching section 186 of each of the above-described terminal units 400, the server coordinate matching section 554 operates for coordinate matching processing necessary for determining if the pieces of information on two nodes N contained in the matching data MM of the map information indicate the same and identical spot or not.

Like the route processor 188 of the first embodiment, the route processor 555 of the second embodiment operates for processing operations and generates information on the traveling route and the traveling time as memory signal Sm on the basis of the input processing server signal Sc and according to the information relating to a request for searching the traveling route as contained in the processing server signal Sc. Then, it appropriately converts the generated memory signal Sm into a processing server signal Sc and outputs it to selected ones or all of the terminal units 400 via the interface 510 and the network 300 according to the processing server signal Sc so as to notify the traveling route and the traveling time to any of the related vehicles that are provided with a terminal unit 400 before the vehicle gets to the destination.

Like the information retriever 189 of the first embodiment, the information retriever 556 of this embodiment hierarchically retrieves the retrieval information stored in the storage 540 typically on the basis of item information and reads it as memory signal Sm on the basis of the input processing server signal Sc and according to the information relating to a request for searching the traveling route as contained in the processing server signal Sc. Then, it appropriately converts the generated memory signal Sm into a processing server signal Sc and outputs it to selected ones of the terminal units 400 via the interface 510 and the network 300 according to the processing server signal Sc so as to deliver the retrieval information.

The calendar modifying section 557 recognizes various pieces of terminal-specific information including information on a calendar modifying request for modifying any of the calendar templates 20 and information on the ID number for identifying the terminal unit 400 that generates and outputs the calendar modifying request on the basis of the input processing server signal Sc, the pieces of information being contained in the signal Sc. Then, like the calendar modifying section 190 of the first embodiment, the calendar modifying section 557 appropriately updates the calendar templates 20 stored in the storage 540 and correlated to the terminal unit 400 that is identified by the terminal-specific information stored in the storage 540 by way of a processing operation.

The timer 558 recognizes the current clock time typically from the reference pulse of an internal clock. Then, the timer 558 appropriately outputs clock time information on the current clock time it recognizes.

The CPU 550 performs computational operations according to the signal Sin input from the input section 520 as a result of an input operation and generates signal Sdp and other signals. Then, it appropriately outputs the generated signals to the display 530, the interface 510 and the storage 540 to operate them according to the input information.

[Operation of Navigation System]

Now, the operation of the navigation system 200 will be described by referring to the drawings. However, the processing operations that are substantially the same as those of the first embodiment will be described only briefly.

(Calendar Template Modifying Process)

Figure 18:
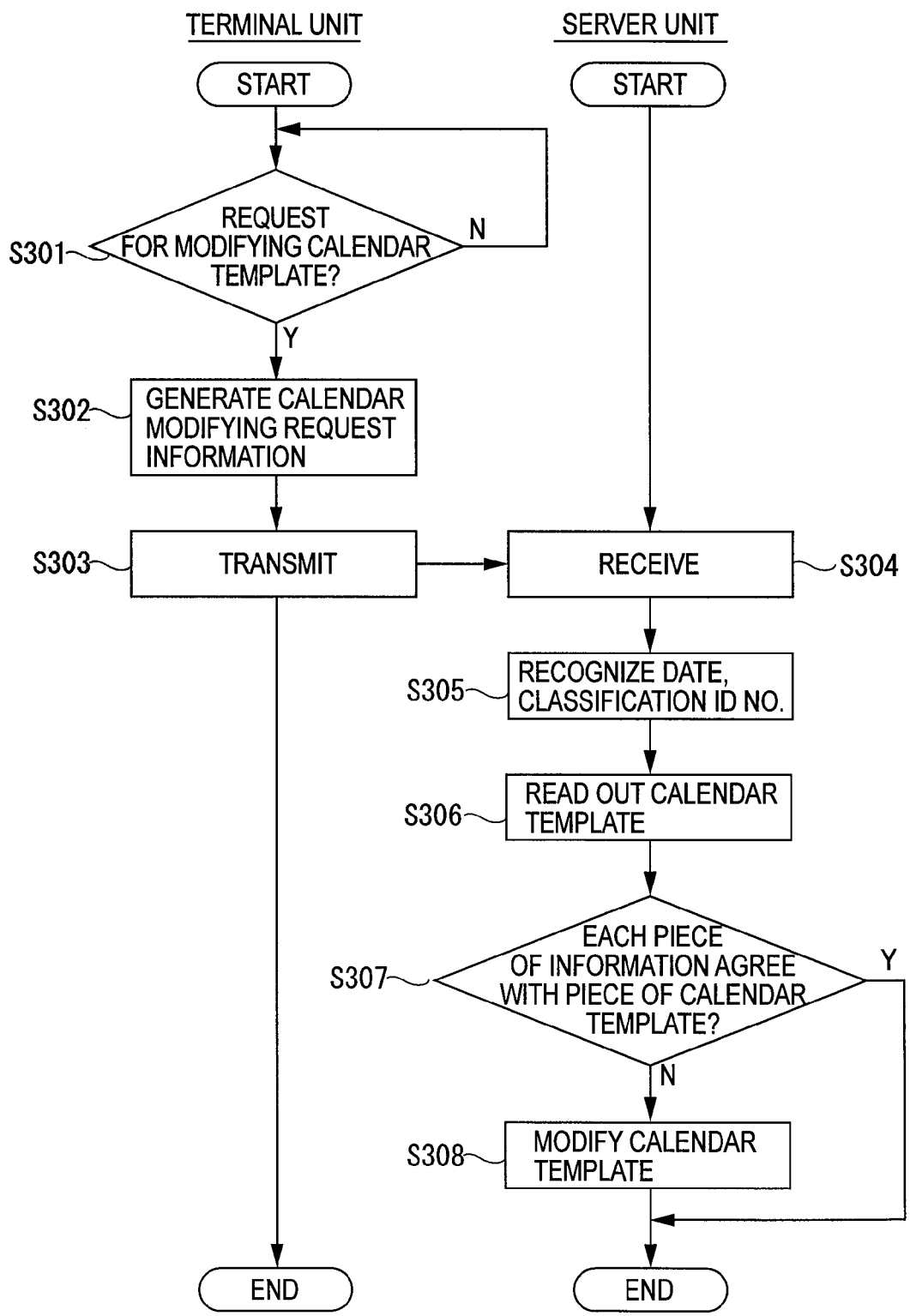
FIG. 18 is a flow chart of the operation of modifying a calendar template of the second embodiment.

Firstly, the calendar template 20 modifying process will be described by referring FIG. 18 as an operation of the navigation system 200. Assume here that the user (diver) modifies a calendar template 20 as shown in FIG. 5 and stored in the storage 540 of the server 500 on the basis of the information he or she recognized typically from radio and/or TV broadcasting, telling that a festival will be held on 5th in City A. FIG. 18 is a flow chart of the operation of modifying a calendar template.

Firstly, the user of the vehicle turns on the power source of the terminal unit 400 of the vehicle to feed power to the device. As power is supplied to the unit, the processor 430 controls the terminal display 140 and causes it to display a main menu and prompt the user to specify and input a specific operation of the terminal unit 400.

Then, as shown in FIG. 18, the user operates the terminal input section 130 to specify an operation of modifying the calendar templates 20. As the processor 430 recognizes by way of the calendar modifying section 557 the input specifying an operation of modifying the calendar templates 20 (Step S301), it causes the terminal display 140 to display an image that prompt the user to specify and input a date and an event necessary for modifying the calendar templates 20.

Thereafter, as the user specifies and inputs a date and an event by operating the terminal input section 130, following the instructions in the displayed image, the processor 430 recognizes the date and the event. Then, the processor 430 generates a calendar modifying request containing the date and the event it recognizes (Step S302) and has the transceiver 410 transmit the generated calendar modifying request to the server 500 via the network 300. When transmitting the calendar modifying request, the processor 430 also transmits the terminal-specific information for identifying the terminal unit 400 in question (Step S303).

As the server 500 receives the calendar modifying request and the terminal-specific information transmitted from the terminal unit 400 (Step S304), it has the calendar modifying section 557 recognize the date and the event contained in the received calendar modifying request (Step S305). More specifically, the calendar modifying section 557 recognizes the specified date as 5th, and the classification ID number correlated to the event as "ID4".

Thereafter, the calendar modifying section 557 reads out the calendar template 20 correlated to the terminal unit 400 that transmitted the calendar modifying request on the basis of the terminal-specific information received in the Step S304 (Step S306). Then, the calendar modifying section 557 determines if the pieces of information it recognizes in the Step S305 agree with the pieces of information contained in the calendar template 20 that is read out in the Step S306 or not (Step S307).

If the calendar modifying section 557 determines in the Step S307 that the two sets of pieces of information agree with each other, it does not modify the calendar template 20 and terminates the processing operation. If, on the other hand, it determines that the two sets of pieces of information do not agree with each other, it modifies the calendar template 20 on the basis of the various pieces of information it recognized in the Step S305 (Step S308). More specifically, since the classification ID number of the 5th as recognized in the Step S305 is "ID4" and the classification ID number of the 5th as recognized from the calendar template 20 is "ID1", the calendar modifying section 557 modifies the classification ID number of the 5th from "ID1" to "ID4", as shown in FIG. 8. Then, the calendar modifying section 557 stores the calendar template 20, in which the classification ID number is modified, in the storage 540, correlating it to the terminal unit 400 that transmitted the calendar modifying request, and terminates the processing operation.

(Process of Searching for Traveling Route)

Now, the process of searching for the traveling route of the navigation system 200 will be described by referring to FIG. 19. FIG. 19 is a flow chart of the operation of searching for a traveling route.

Firstly, the user operates the terminal input section 130 to input a command for searching the traveling route of the vehicle as shown in FIG. 19. As the processor 430 recognizes the input of the command for searching the traveling route of the vehicle (Step S401), the processor 430 causes the terminal display section 140 to display an image prompting the user to enter various pieces of information necessary for searching the traveling route such as the destination, the shortest traveling distance, the shortest traveling time and the necessity of predicting traffic jams.

Then, as the processor 430 recognizes the various pieces of information necessary for searching the traveling route, it has the current position recognizer 181 recognize the current position of the vehicle (Step S402) and the destination recognizer 182 recognize the specified and input destination (Step S403). Additionally, the processor 430 acquires the information on the selected items (Step S404). The information on the current position, the destination and the selected items are appropriately stored in the memory 420.

Thereafter, the processor 430 controls the transceiver 410 and has it transmit the information on the current position, the destination and the selected items stored in the memory 420 to the server 500 along with the signal requesting the server 500 to search the traveling route. When transmitting the various pieces of information, the processor 430 also transmits the terminal-specific information necessary for identifying the terminal unit 400 in question (Step S405).

As the server 500 receives the various pieces of information transmitted from the terminal unit 400 (Step S406), it has the route processor 555 of the CPU 550 determine if the information on the selected items it receives contains a request for prediction of traffic jams or not (Step S407).

If the CPU 550 determines in the Step S407 by means of the rout processor 555 that no request for prediction of traffic jams is contained, it acquires VICS data by means of the VICS data acquirer 552. Then, the CPU 550 has the traffic jam condition recognizer 553 to generate current traffic jam information of an area containing the current position and the destination from the obtained VICS data. Thereafter, the CPU 550 has the route processor 555 perform a route searching processing operation of searching for the traveling route from the current position of the vehicle to the destination on the basis of the information on the current position, the destination, the selected items and the current traffic jam condition (Step S408).

More specifically, the route processor 555 generates traveling route information on a certain number of candidate traveling routes that meets the requirements of the user, using the map information stored in the storage 540. Subsequently, it performs a processing operation for selecting the number of candidate traveling routes so as to narrow down the candidate transmitting routes to a fewer number of candidate traveling routes as shown in FIG. 10 and described above for the first embodiment and notifying the terminal unit 400 of the selected traveling routes. It additionally generates traveling time information by determining the traveling time that needs to be spent before getting to the destination for each of the candidate traveling routes.

If, on the other hand, the route processor 555 determines in the Step S407 that a request for prediction of traffic jams is contained, it acquires the clock time from the timer 558 and recognizes the current date from the acquired clock time. Then, the CPU 550 has the traffic jam condition recognizer 553 read out the calendar template 20 that is correlated to the terminal unit 400 that requests for searching the traveling route from the storage 540 on the basis of the terminal-specific information received in the Step S406, thereafter, it retrieves and recognizes the classification ID number of the recognized data from the read out calendar template 20 (Step S409). Additionally, it recognizes the current position and the destination of the vehicle from the information on the current position and the destination received in the Step S406. Then, the traffic jam condition recognizer 553 retrieves and acquires the time series data 12$i$ that corresponds to the recognized classification ID number and contains the current position and the destination from the traffic jam prediction table 10 stored in the storage 540 (Step S410).

Thereafter, the CPU 550 performs the processing operation of the Step S408. More specifically, the CPU 550 generates current traffic jam information by means of the traffic jam condition recognizer 553. Then, the CPU 550 detects a plurality of candidate traveling routes on the basis of the acquired information on the current position, the destination, the selected item and the current traffic jam condition and narrows them down to a fewer number of candidate traveling routes on the basis of the acquired information on the selected items to generate information on the candidate traveling routes that meets the requirements of the user.

Then, the CPU 550 has the traffic jam condition recognizer 553 acquire the current time and day from the timer 558. Then, the traffic jam condition recognizer 553 determines the expected arrival time of getting to a selected point on each of the candidate traveling routes contained in the information on the candidate traveling routes generated by the route processor 555 on the basis of the current traffic jam information and the current time and day it acquires. Then, the traffic jam condition recognizer 553 predicts the traffic jam on each of the candidate traveling routes at the expected arrival time of getting to the selected point on the basis of the time series data 12$i$ acquired in the Step S410 and generates traffic jam prediction information on the condition of each of the predicted traffic jams.

Then, the CPU 550 narrows down the candidate traveling routes in the candidate traveling route information to a fewer number of candidate traveling routes according to the processing operation for selecting the number of candidate traveling routes as shown in FIG. 10 by means of the route processor 555 on the basis of the current traffic jam information and the traffic jam prediction information to generate traveling route information on a number of candidate traveling routes that meet the requirements of the user. Additionally, the route processor 555 determines the traveling time necessary for getting to the destination by each of the candidate traveling routes in the traveling route information to generate traveling time information.

After the Step S408, the server 500 controls the interface 510 on the basis of the terminal-specific information received in the Step S406 and appropriately transmits the traveling route information, the traffic jam prediction information, the traveling time information and the current traffic jam information obtained as a result of the route searching processing operation to the terminal unit 400 in question along with map information (Step S411). It may acquire the matching data MM in advance on the basis of the information on the current position. When transmitting the map information, it is sufficient for the server 500 to transmit the matching mesh information MMx of the matching data MM that contain the nodes N and the links L for the roads of the traveling routes, the display mesh information VMx of the display data VM for other areas, the name information VMxA and the background information VMxC in the area that corresponds to the matching mesh information MMx.

As the processor 430 of the terminal unit 400 receives the various pieces of information (Step S412), it performs coordinate matching processing operations for the received matching data MM (Step S413) and recognizes the road conditions, or the conditions on the connections of the roads, which are then appropriately stored in the memory 420. Additionally, the processor 430 operates the display controller 184 so as to have the terminal display 140 display the information on the candidate traveling routes, e.g., five candidate traveling routes computationally determined by the server 500, and an image prompting the user to select one of the candidate traveling routes. The traveling route is defined when the user selects one of the candidate traveling routes.

Thereafter, the processor 430 controls the terminal display 140 by means of the display controller 184 so as to have it superimpose an icon that indicates the current position of the vehicle on the acquired map information on the basis of the information on the current position and also the traveling route selected by the user, the traffic jam prediction information, the expected traveling time and the current traffic jam information. For example, assume here that, by the traffic jam recognizer 553 of the server 500, no traffic jam takes place currently on the roads that connect the current position S1 and the destination G with the shortest distance, while no traffic jam is predicted at any point on the traveling route for getting to the destination G. In such a situation, various pieces of information as described above by referring to the first embodiment are superimposed as shown in FIG. 12A.

Subsequently, the processor 430 recognizes the running condition of the vehicle on the basis of the various data output from the sensor 110. Additionally, the processor 430 notifies the user of guidance information by way of the guidance providing section 183 for guiding the travel of the vehicle on the basis of the recognized moving condition and the route guidance information contained in the traveling route information (Step S414). The guidance information is provided to the user by way of the terminal display and/or in voice.

Thereafter, the server 500 acquires VICS data by way of the VICS data acquirer 552. Then, if the moving condition of the vehicle can be influenced and the user can be forced to alter the traveling route according to the VICS data acquired by way of the VICS data acquirer 552, for example in a case there is a traffic accident, the CPU 550 generates information for confirming a rerouting operation for the purpose of confirming if the route searching operation needs to be repeated or not. Then, it controls the interface 510 to transmit the information for confirming a rerouting operation to the terminal unit 400 in question on the basis of the terminal-specific information received in the Step S406.

Upon receiving the information for confirming a rerouting operation, the processor 430 of the terminal unit 400 that receives the information has the display controller 184 display an image for prompting the user to decide if he or she wants to repeat the route searching operation or not and input the decision along with information on the destination and the selected items on the terminal display 140. Thereafter, upon recognizing the input for the decision of the user on repeating the route searching operation or not and the information on the destination and selected items, the processor 430 generates a rerouting request information containing the information it recognizes. Then, the processor 430 controls the transceiver 410 to transmit the rerouting request information and the terminal-specific information to the server 500.

Upon receiving the various pieces of information transmitted from the terminal unit 400, the server 500 recognizes if the route searching operation is to be repeated or not on the basis of the rerouting request information it receives. It does not perform any processing operation when it recognizes that the route searching operation does not need to be repeated. When, on the other hand, it recognizes that the route searching operation needs to be repeated, the CPU 550 repeats the route searching operation from the Step S407 to the Step S411 in response to the rerouting request. Then, the server 500 controls the interface 510 according to the terminal-specific information it receives and transmits the various pieces of information obtained as a result of the repeated route searching operation along, if necessary, with map information, to the terminal unit 400 in question.

As the processor 430 of the terminal unit 400 receives the various pieces of information from the server 500, it performs the processing operation of the Step S412 and that of the Step S413. If it is recognized by the traffic jam condition recognizer 553 of the server 500 that a traffic jam takes place on the road R12 but it is predicted that no traffic jam will take place at any selected point on the route to the destination G, various pieces of information as shown in FIG. 12B are superimposed on the map being displayed as in the case of the first embodiment.

Assume now that subsequently the server 500 repeats the route searching operation in response to the information requesting a rerouting operation from the terminal unit 400 and the terminal unit 400 receives the various pieces of information obtained as a result of repeating the route searching operation and that the traffic jam condition recognizer 553 recognizes that the traffic jam on the road R12 is not dissolved yet and one or more than one traffic jams will take place on the road R13 to the destination G. Then, various pieces of information as shown in FIG. 12C are superimposed on the map being displayed as in the case of the first embodiment.

[Advantages of Second Embodiment]

As described above in detail, in the second embodiment, as the server 500 recognizes a request for searching the traveling route of the vehicle that is provided with a terminal unit 400 transmitted from the terminal unit 400 along with information on the current position of the vehicle and the destination of the vehicle, it acquires VICS data on the traffic condition of the vehicle including the traffic jam that is taking place to the vehicle, if any, and as in the case of the first embodiment, and recognizes the traffic jam rating, or the extent of trouble that may be produced by the traffic jam, of each traveling route searched by the route processor 188, using map information on the basis of current position information and destination information. Then, the number of candidate traveling routes that is notified to the terminal unit 400 is increased as a function of traffic jam rating. Therefore, as in the case of the first embodiment, the number of candidate traveling routes from which the user can select the actual traveling route is increased as the traffic jam rating rises in order to accommodate a situation where secondary traffic jams can take place on any candidate traveling route so that it is possible to provide the user with useful traveling route information and appropriate guidance. Additionally, if this system is widely used by a large number of users, the traveling routes selected by the users (drivers) will show dispersions to consequently suppress possible secondary traffic jams as the number of candidate traveling routes that are notified to the user increases. Moreover, it is possible for the user to select a suitable traveling route, reliably avoiding traffic jams, and obtain useful guidance when candidate traveling routes are narrowed on the basis of predicted traffic jam information.

Additionally, in the second embodiment, the server 500 stores a traffic jam prediction table 10 that is utilized for traffic jam predictions and involves a relatively large amount of data along with map information. Therefore, the terminal units 400 can be made to have a simple configuration and, as the server 500 updates the map information and the traffic jam prediction table 10, the terminal units 400 can share the updated information to improve the ability of the navigation system 200 in terms of maintenance, management and operation. At the same time, the terminal units 400 are adapted to acquire the most updated information so that the user of a vehicle carrying such a terminal unit 400 can be navigated according to the most updated information to a great convenience on the part of the user.

Additionally, the server 500 that stores the map information and the traffic jam prediction table 10 searches the traveling route of the vehicle and delivers information on the traveling route to the terminal unit 400. With this arrangement, the load of processing operations of the terminal units 400 can be reduced. In other words, the terminal units 400 are not required to have a large processing capacity so that terminal units 400 can be made to have a simple configuration. Therefore, mobile phones that are compact, lightweight and less expensive may be used for such terminal units 400 to expand the market of such navigation systems.

Additionally, the processor 180 of each of the terminal unit 400 and the CPU 550 of the server 500 are realized by programs to facilitate the use of map information and further expand the market for such navigation systems. Still additionally, the programs may be recorded on recording mediums so that a computing unit, or a computer, can read them in order to facilitate the use of the map information and that of the programs to further expand the market of such navigation system. The computing unit may not necessarily be a single computer but a plurality of computers that are combined to form a network. Alternatively, the computing unit may be a circuit board on which CPUs, microcomputers and other elements are mounted along with a number of electronic parts.

[Modifications of Embodiments]

The present invention is by no means limited to the above described embodiments, which may be modified and altered without departing from the scope of the present invention.

As described above, a moving body is not limited to a vehicle for the purpose of the present invention and may alternatively be an aircraft or a ship. When the user carries the terminal unit 400 as a portable device, the current position of the user may be recognized as that of the moving body. Additionally, as described above, the terminal unit 400 may be a mobile phone or PHS (personal handyphone system) that the user carries and the server 500 may be the base station of the mobile phone or PHS so that the mobile phone or PHS acquires information from the base station. In any case, the present invention is most effectively applicable to a moving body to which a traffic jam can be an obstacle against its movement.

For the purpose of the present invention, the traffic condition is not necessarily limited to traffic jam condition and may include any situations relating to the travel of a moving body.

While the number of the traveling routes obtained by computations is narrowed down to a fewer number of traveling routes as a result of recognizing traffic jam conditions on the routes in the above description, the present invention is by no means limited thereto. For example, as shown in FIG. 20, it may be so arranged that no traveling routes are selected and, when a traffic jam takes place or is predicted to take place on the current traveling route while the vehicle is running (Step S611), the navigation device searches for a traveling route to avoid the traffic jam (Step S612). Then, the processing operations from the Step S63 may be performed on the basis of the rating of the traffic jam that takes place or is predicted to take place like those of the process of selecting the number of the candidate traveling routes of the first embodiment illustrated in FIG. 10.

Additionally, the number of ratings of traffic jam is not necessarily limited to four. Nor the number of candidate traveling routes is limited to the above described one. While a number of candidate traveling routes are selected and then narrowed down to a fewer number of candidate traveling routes in the above description, alternatively a small number of candidate traveling routes obtained by taking selected items into consideration and on the basis of the traffic jam rating of each candidate traveling route may be notified to the user at a time. Still alternatively, a number of candidate traveling routes are selected and the number may be reduced when notifying the user depending on the traffic jam rating of each candidate traveling route.

While a small number of candidate traveling routes are selected and notified to the user on the basis of the destination information and the information on the selected items in the above description, candidate traveling routes may alternatively be searched for and selected only on the basis of the information on the current position of the vehicle and the destination information. Furthermore, while information on the current position of the vehicle that is recognized by the current position recognizer is acquired on the basis of the output data from various sensors and the GPS data output from the GPS receiver in the above description, any other appropriate method may be used for the purpose of recognizing the current position of the moving body. As described above, the assumed current position input by means of the terminal input section 130 can be recognized as the current position.

While many of the functions are realized in the form of programs in the above description, some of them may be replaced by hardware such as circuit boards and/or elements such as ICs (integrated circuits). The market for navigation systems according to the present invention will expand when the programs are readably stored in a separate recording medium for the convenience of handling.

Still additionally, while the traveling time to the destination is computed for each of the narrowed down candidate traveling routes in the above description, the processing operation of narrowing down candidate traveling routes to a fewer number as shown in FIG. 10 may be performed after computing the traveling time of each of the candidate traveling routes before narrowing them down.

While the server 500 stores map information and the traffic jam prediction table 10 in the above described second embodiment, it may alternatively be so arranged that at least either the map information or the traffic jam prediction table 10 is stored in the terminal units 400.

While the transceiver 410 is arranged in the terminal unit 400 in the above description, the transceiver 410 may be separated from the terminal unit 400 and a mobile phone or PHS may be used as the transceiver 410 so that information may be exchanged between the transceiver 410 and the terminal unit 400.

Furthermore, any of the arrangements and the procedures of a device or a system according to the present invention may be modified and altered appropriately without departing from the scope of the present invention.

[Advantages of Embodiments]

As described above in detail, each of the above described embodiments acquires map information, current position information or information on the current position of the vehicle, destination information or information on the destination of the vehicle and VICS data or traffic information on the traffic condition of the traveling route of the vehicle including traffic jam information and recognizes the traffic jam rating, or the extent of trouble that may be produced by the traffic jam, of each traveling route searched by the route processor 188, using map information on the basis of current position information and destination information. Then, the number of candidate traveling routes is increased as a function of traffic jam rating. Thus, the number of candidate traveling routes from which the user can select the actual traveling route is increased to accommodate a situation where traffic jams are apt to occur secondarily in other traveling routes as the traffic jam rating of the current traveling route rises and, therefore, it is possible to provide the user with useful traveling route information and appropriate guidance.

Each of the above described embodiments acquires information on the traffic condition of a predetermined clock time of a predetermined date by utilizing calendar templates 20 obtained on the basis of a traffic jam prediction table 10 that contains statistic traffic information obtained by statistically processing map information, current position information or information on the current position of the vehicle, destination information or information on the destination of the vehicle and traffic conditions in the past in terms of temporal elements and recognizes the traffic jam rating, or the extent of trouble that may be produced by the traffic jam, of each traveling route searched by the route processor 188, using map information on the basis of current position information and destination information. Then, the number of candidate traveling routes is increased as a function of traffic jam rating. Thus, the number of candidate traveling routes from which the user can select the actual traveling route is increased to accommodate a situation where traffic jams are apt to occur secondarily in other traveling routes as the traffic jam rating of the current traveling route rises and, therefore, it is possible to provide the user with useful traveling route information and appropriate guidance.

Additionally, each of the above described embodiments acquires map information, current position information or information on the current position of the vehicle and VICS data or traffic information on the traffic condition of the traveling route of the vehicle including traffic jam information and recognizes the traffic jam rating, or the extent of trouble that may be produced by the traffic jam, of each traveling route searched on the basis of the VICS data. Then, the number of candidate traveling routes for avoiding areas of traffic jams is increased as a function of traffic jam rating. Thus, the number of candidate traveling routes from which the user can select the actual traveling route is increased to accommodate a situation where traffic jams are apt to occur secondarily in other traveling routes as the traffic jam rating of the current traveling route rises and, therefore, it is possible to provide the user with useful traveling route information and appropriate guidance.

Furthermore, each of the above described embodiments acquires information on the traffic condition of a predetermined clock time of a predetermined date by utilizing calendar templates 20 obtained on the basis of a traffic jam prediction table 10 that contains statistic traffic information obtained by statistically processing map information, current position information or information on the current position of the vehicle and traffic conditions in the past in terms of temporal elements and recognizes the traffic jam rating, or the extent of trouble that may be produced by the traffic jam, of each traveling route on the basis of the acquired information on the traffic condition. Then, the number of candidate traveling routes for avoiding areas of traffic jams is increased as a function of traffic jam rating. Thus, the number of candidate traveling routes from which the user can select the actual traveling route is increased to accommodate a situation where traffic jams are apt to occur secondarily in other traveling routes as the traffic jam rating of the current traveling route rises and, therefore, it is possible to provide the user with useful traveling route information and appropriate guidance.

Additionally, the map information stored in the server 500 is distributed to the terminal units 400 through the network 300 so that, if the map information is modified, the terminal units 400 do not need to modify the map information to a great convenience on the part of the terminal units 400.

The invention claimed is:

1. A navigation device comprising:
   a map information acquirer for acquiring map information;
   a current position information acquirer for acquiring current position information on a current position of a moving body;
   a destination information acquirer for acquiring destination information on a location of a destination to which the moving body moves;
   a traffic information acquirer for acquiring traffic information on a traffic condition relating to the moving body;
   a traveling route searcher that can search a plurality of traveling routes of the moving body on the basis of the current position information and the destination information and by using the map information;
   a trouble extent recognizer for recognizing an extent of trouble for the moving body to move on each of the searched traveling routes on the basis of the traffic information acquired by the traffic information acquirer; and
   a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

2. The navigation device according to claim 1, further comprising:
   a statistic traffic information acquirer for acquiring statistic traffic information obtained by statistically processing a past traffic condition in terms of a temporal element; and
   a traffic condition recognizer for recognizing a traffic condition at a predetermined clock time of a predetermined date on the basis of the statistic traffic information,
   wherein the trouble extent recognizer recognizes the extent of trouble on the basis of at least the traffic information acquired by the traffic information acquirer or the traffic condition recognized by the traffic condition recognizer.

3. A navigation device comprising:
   a map information acquirer for acquiring map information;
   a current position information acquirer for acquiring current position information on a current position of a moving body;

a destination information acquirer for acquiring destination information on a location of a destination to which the moving body moves;

a statistic traffic information acquirer for acquiring statistic traffic information obtained by statistically processing a past traffic condition in terms of a temporal element;

a traffic condition recognizer for recognizing a traffic condition at a predetermined clock time of a predetermined date on the basis of the statistic traffic information;

a traveling route searcher that can search a plurality of traveling routes of the moving body on the basis of the current position information and the destination information and by using the map information;

a trouble extent recognizer for recognizing an extent of trouble for the moving body to move on each of the searched traveling routes on the basis of the traffic information acquired by the traffic condition recognizer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

4. The navigation device according to claim 1, wherein the traveling route searcher recognizes the extent of trouble of each of the plurality of searched traveling routes so as to increase the number of traveling routes to be notified by the notifier as a function of increase in the overall extent of trouble as determined on the basis of each extent of trouble.

5. The navigation device according to claim 3, wherein the traveling route searcher recognizes the extent of trouble of each of the plurality of searched traveling routes so as to increase the number of traveling routes to be notified by the notifier as a function of increase in the overall extent of trouble as determined on the basis of each extent of trouble.

6. The navigation device according to claim 1, wherein the traveling route searcher searches the traveling route so as to decrease the number of traveling routes to be notified by the notifier as a function of increase in the number of searched traveling routes showing an extent of trouble not higher than a predetermined level.

7. The navigation device according to claim 3, wherein the traveling route searcher searches the traveling route so as to decrease the number of traveling routes to be notified by the notifier as a function of increase in the number of searched traveling routes showing an extent of trouble not higher than a predetermined level.

8. A navigation device comprising:
a map information acquirer for acquiring map information;
a current position information acquirer for acquiring current position information on a current position of a moving body;
a traffic information acquirer for acquiring traffic information on a traffic condition relating to the moving body;
a trouble extent recognizer for recognizing an extent of trouble for the moving body to move on each of the searched traveling routes on the basis of the traffic information acquired by the traffic information acquirer;
a traveling route searcher for searching a plurality of traveling routes to avoid an area with the trouble using the map information on the basis of the current position information by recognizing the trouble and the extent of trouble by the trouble extent recognizer; and
a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

9. The navigation device according to claim 8, further comprising:
a statistic traffic information acquirer for acquiring statistic traffic information obtained by statistically processing a past traffic condition in terms of a temporal element; and
a traffic condition recognizer for recognizing a traffic condition at a predetermined clock time of a predetermined date on the basis of the statistic traffic information,
wherein the trouble extent recognizer recognizes the extent of trouble on the basis of at least the traffic information acquired by the traffic information acquirer or the traffic condition recognized by the traffic condition recognizer.

10. A navigation device comprising:
a map information acquirer for acquiring map information;
a current position information acquirer for acquiring current position information on a current position of a moving body;
a statistic traffic information acquirer for acquiring statistic traffic information obtained by statistically processing a past traffic condition in terms of a temporal element;
a traffic condition recognizer for recognizing a traffic condition at a predetermined clock time of a predetermined date on the basis of the statistic traffic information;
a trouble extent recognizer for recognizing an extent of trouble for the moving body to move on the basis of the traffic condition recognized by the traffic condition recognizer;
a traveling route searcher that can search a plurality of traveling routes to avoid an area with the trouble using the map information on the basis of the current position information by recognizing the trouble and the extent of trouble by the trouble extent recognizer; and
a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

11. The navigation device according to claim 8, wherein the trouble extent recognizer recognizes the extent of trouble in a predetermined area in the map information.

12. The navigation device according to claim 10, wherein the trouble extent recognizer recognizes the extent of trouble in a predetermined area in the map information.

13. The navigation device according to claim 8, wherein the trouble extent recognizer recognizes the extent of trouble in a predetermined area including the current position of the moving body on the basis of the current position information.

14. The navigation device according to claim 10, wherein the trouble extent recognizer recognizes the extent of trouble in a predetermined area including the current position of the moving body on the basis of the current position information.

15. The navigation device according to claim 8, further comprising:
a moving direction detector for detecting the moving direction of a moving body,
wherein the trouble extent recognizer recognizes the extent of trouble in a predetermined area located forwardly in the moving direction of the moving body as detected by the moving direction detector.

16. The navigation device according to claim 10, further comprising:
a moving direction detector for detecting the moving direction of a moving body,
wherein the trouble extent recognizer recognizes the extent of trouble in a predetermined area located forwardly in the moving direction of the moving body as detected by the moving direction detector.

17. The navigation device according to claim 1, wherein the notifier notifies that there is no trouble when the trouble extent recognizer cannot recognize any extent of trouble.

18. The navigation device according to claim 3, wherein the notifier notifies that there is no trouble when the trouble extent recognizer cannot recognize any extent of trouble.

19. The navigation device according to claim 8, wherein the notifier notifies that there is no trouble when the trouble extent recognizer cannot recognize any extent of trouble.

20. The navigation device according to claim 10, wherein the notifier notifies that there is no trouble when the trouble extent recognizer cannot recognize any extent of trouble.

21. A navigation system comprising:
a server having a storage for storing map information; and
a navigation device for acquiring the map information from the server via a network, which comprises:
a map information acquirer for acquiring map information;
a current position information acquirer for acquiring current position information on a current position of a moving body;
a destination information acquirer for acquiring destination information on a location of a destination to which the moving body moves;
a traffic information acquirer for acquiring traffic information on a traffic condition relating to the moving body;
a traveling route searcher that can search a plurality of traveling routes of the moving body on the basis of the current position information and the destination information and by using the map information;
a trouble extent recognizer for recognizing an extent of trouble for the moving body to move on each of the searched traveling routes on the basis of the traffic information acquired by the traffic information acquirer; and
a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

22. A navigation system comprising:
a server having a storage for storing map information; and
a navigation device for acquiring the map information from the server via a network, which comprises:
a map information acquirer for acquiring map information;
a current position information acquirer for acquiring current position information on a current position of a moving body;
a destination information acquirer for acquiring destination information on a location of a destination to which the moving body moves;
a statistic traffic information acquirer for acquiring statistic traffic information obtained by statistically processing a past traffic condition in terms of a temporal element;
a traffic condition recognizer for recognizing a traffic condition at a predetermined clock time of a predetermined date on the basis of the statistic traffic information;
a traveling route searcher that can search a plurality of traveling routes of the moving body on the basis of the current position information and the destination information and by using the map information;
a trouble extent recognizer for recognizing an extent of trouble for the moving body to move on each of the searched traveling routes on the basis of the traffic information acquired by the traffic condition recognizer; and
a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

23. A navigation system comprising:
a server having a storage for storing map information; and
a navigation device for acquiring the map information from the server via a network, which comprises:
a map information acquirer for acquiring map information;
a current position information acquirer for acquiring current position information on a current position of a moving body;
a traffic information acquirer for acquiring traffic information on a traffic condition relating to the moving body;
a trouble extent recognizer for recognizing an extent of trouble for the moving body to move on each of the searched traveling routes on the basis of the traffic information acquired by the traffic information acquirer;
a traveling route searcher for searching a plurality of traveling routes to avoid an area with the trouble using the map information on the basis of the current position information by recognizing the trouble and the extent of trouble by the trouble extent recognizer; and
a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

24. A navigation system comprising:

a server having a storage for storing map information; and a navigation device for acquiring the map information from the server via a network, which comprises:

a map information acquirer for acquiring map information;

a current position information acquirer for acquiring current position information on a current position of a moving body;

a statistic traffic information acquirer for acquiring statistic traffic information obtained by statistically processing a past traffic condition in terms of a temporal element;

a traffic condition recognizer for recognizing a traffic condition at a predetermined clock time of a predetermined date on the basis of the statistic traffic information;

a trouble extent recognizer for recognizing an extent of trouble for the moving body to move on the basis of the traffic condition recognized by the traffic condition recognizer;

a traveling route searcher that can search a plurality of traveling routes to avoid an area with the trouble using the map information on the basis of the current position information by recognizing the trouble and the extent of trouble by the trouble extent recognizer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

25. A navigation system comprising:

a server having a map information storage for storing map information and a statistic traffic information storage for storing statistic traffic information; and a navigation device for acquiring the map information and the statistic traffic information from the server via a network, which comprises:

a map information acquirer for acquiring map information;

a current position information acquirer for acquiring current position information on a current position of a moving body;

a destination information acquirer for acquiring destination information on a location of a destination to which the moving body moves;

a traffic information acquirer for acquiring traffic information on a traffic condition relating to the moving body;

a traveling route searcher that can search a plurality of traveling routes of the moving body on the basis of the current position information and the destination information and by using the map information;

a trouble extent recognizer for recognizing an extent of trouble for the moving body to move on each of the searched traveling routes on the basis of the traffic information acquired by the traffic information acquirer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer, the device further comprising:

a statistic traffic information acquirer for acquiring statistic traffic information obtained by statistically processing a past traffic condition in terms of a temporal element; and a traffic condition recognizer for recognizing a traffic condition at a predetermined clock time of a predetermined date on the basis of the statistic traffic information, wherein the trouble extent recognizer recognizes the extent of trouble on the basis of at least the traffic information acquired by the traffic information acquirer or the traffic condition recognized by the traffic condition recognizer.

26. A navigation system comprising:

a server having a map information storage for storing map information and a statistic traffic information storage for storing statistic traffic information; and a navigation device for acquiring the map information and the statistic traffic information from the server via a network, which comprises:

a map information acquirer for acquiring map information;

a current position information acquirer for acquiring current position information on a current position of a moving body;

a destination information acquirer for acquiring destination information on a location of a destination to which the moving body moves;

a statistic traffic information acquirer for acquiring statistic traffic information obtained by statistically processing a past traffic condition in terms of a temporal element;

a traffic condition recognizer for recognizing a traffic condition at a predetermined clock time of a predetermined date on the basis of the statistic traffic information;

a traveling route searcher that can search a plurality of traveling routes of the moving body on the basis of the current position information and the destination information and by using the map information;

a trouble extent recognizer for recognizing an extent of trouble for the moving body to move on each of the searched traveling routes on the basis of the traffic information acquired by the traffic condition recognizer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

27. A navigation system comprising:

a server having a map information storage for storing map information and a statistic traffic information storage for storing statistic traffic information; and a navigation device for acquiring the map information and the statistic traffic information from the server via a network, which comprises:

a map information acquirer for acquiring map information;

a current position information acquirer for acquiring current position information on a current position of a moving body;

a traffic information acquirer for acquiring traffic information on a traffic condition relating to the moving body;

a trouble extent recognizer for recognizing an extent of trouble for the moving body to move on each of the searched traveling routes on the basis of the traffic information acquired by the traffic information acquirer;

a traveling route searcher for searching a plurality of traveling routes to avoid an area with the trouble using the map information on the basis of the current position information by recognizing the trouble and the extent of trouble by the trouble extent recognizer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer the device further comprising:

a statistic traffic information acquirer for acquiring statistic traffic information obtained by statistically processing a past traffic condition in terms of a temporal element; and a traffic condition recognizer for recognizing a traffic condition at a predetermined clock time of a predetermined date on the basis of the statistic traffic information, wherein the trouble extent recognizer recognizes the extent of trouble on the basis of at least the traffic information acquired by the traffic information acquirer or the traffic condition recognized by the traffic condition recognizer.

28. A navigation system comprising:

a server having a map information storage for storing map information and a statistic traffic information storage for storing statistic traffic information; and a navigation device for acquiring the map information and the statistic traffic information from the server via a network, which comprises:

a map information acquirer for acquiring map information;

a current position information acquirer for acquiring current position information on a current position of a moving body;

a statistic traffic information acquirer for acquiring statistic traffic information obtained by statistically processing a past traffic condition in terms of a temporal element;

a traffic condition recognizer for recognizing a traffic condition at a predetermined clock time of a predetermined date on the basis of the statistic traffic information;

a trouble extent recognizer for recognizing an extent of trouble for the moving body to move on the basis of the traffic condition recognized by the traffic condition recognizer;

a traveling route searcher that can search a plurality of traveling routes to avoid an area with the trouble using the map information on the basis of the current position information by recognizing the trouble and the extent of trouble by the trouble extent recognizer; and a notifier for notifying at least one of the plurality of traveling routes searched by the traveling route searcher, wherein the traveling route searcher searches the traveling route so as to increase a number of traveling routes to be notified by the notifier as a function of increase in the extent of trouble as recognized by the trouble extent recognizer.

29. A navigation method comprising the steps of:

acquiring map information, current position information on a current position of a moving body, destination information on a location of a destination to which the moving body moves and traffic information on a traffic condition relating to the moving body;

recognizing an extent of trouble using the map information for the moving body to move on each of traveling routes searched on the basis of the current position information and the destination information on the basis of the traffic information; and increasing a number of traveling routes to be notified as a function of increase in the recognized extent of trouble.

30. A navigation method comprising the steps of:

acquiring map information, current position information on a current position of a moving body, destination information on a location of a destination to which the moving body moves and a traffic condition at a predetermined clock time of a predetermined date provided on the basis of statistic traffic information obtained by statistically processing a past traffic condition in terms of a temporal element;

recognizing an extent of trouble using the map information for the moving body to move on each of traveling routes searched on the basis of the current position information and the destination information on the basis of the traffic condition; and increasing a number of traveling routes to be notified as a function of increase in the recognized extent of trouble.

31. A navigation method comprising the steps of:

acquiring map information, current position information on a current position of a moving body and traffic information on a traffic condition relating to the moving body;

recognizing a trouble and an extent of trouble for the moving body to move on a traveling route on the basis of the traffic information; and searching a traveling route for avoiding an area with the trouble on the basis of the current position information, using the map information, so as to increase a number of traveling routes for avoiding the area with the trouble as a function of increase in the recognized extent of trouble.

32. A navigation method comprising the steps of:

acquiring map information, current position information on a current position of a moving body and a traffic condition at a predetermined clock time of a predetermined date provided on the basis of statistic traffic information obtained by statistically processing a past traffic condition in terms of a temporal element;

recognizing a trouble and an extent of trouble for the moving body to move on the basis of the traffic condition; and searching a traveling route for avoiding an area with the trouble on the basis of the current position information, using the map information, so as to increase a number of traveling routes for avoiding the area with the trouble as a function of increase in the recognized extent of trouble.

33. A navigation program operatable in a computer for performing a navigation method, the program including a set of computer-executable instructions stored on a recording medium, the set of instructions comprising at least an instruction for:

acquiring map information, current position information on a current position of a moving body, destination information on a location of a destination to which the moving body moves and traffic information on a traffic condition relating to the moving body;

recognizing an extent of trouble using the map information for the moving body to move on each of traveling routes searched on the basis of the current position information and the destination information on the basis of the traffic information; and increasing a number of traveling routes to be notified as a function of increase in the recognized extent of trouble.

34. A navigation program operatable in a computer for performing a navigation method, the program including a set of computer-executable instructions stored on a recording medium, the set of instructions comprising at least an instruction for:

acquiring map information, current position information on a current position of a moving body, destination information on a location of a destination to which the moving body moves and a traffic condition at a predetermined clock time of a predetermined date provided on the basis of statistic traffic information obtained by statistically processing a past traffic condition in terms of a temporal element;

recognizing an extent of trouble using the map information for the moving body to move on each of traveling routes searched on the basis of the current position information and the destination information on the basis of the traffic condition; and increasing a number of traveling routes to be notified as a function of increase in the recognized extent of trouble.

35. A navigation program operatable in a computer for performing a navigation method, the program including a set of computer-executable instructions stored on a recording medium, the set of instructions comprising at least an instruction for:

acquiring map information, current position information on a current position of a moving body and traffic information on a traffic condition relating to the moving body;

recognizing a trouble and an extent of trouble for the moving body to move on a traveling route on the basis of the traffic information; and searching a traveling route for avoiding an area with the trouble on the basis of the current position information, using the map information, so as to increase a number of traveling routes for avoiding the area with the trouble as a function of increase in the recognized extent of trouble.

36. A navigation program operatable in a computer for performing a navigation method, the program including a set of computer-executable instructions stored on a recording medium, the set of instructions comprising at least an instruction for:

acquiring map information, current position information on a current position of a moving body and a traffic condition at a predetermined clock time of a predetermined date provided on the basis of statistic traffic information obtained by statistically processing a past traffic condition in terms of a temporal element;

recognizing a trouble and an extent of trouble for the moving body to move on the basis of the traffic condition; and searching a traveling route for avoiding an area with the trouble on the basis of the current position information, using the map information, so as to increase a number of traveling routes for avoiding the area with the trouble as a function of increase in the recognized extent of trouble.

37. A recording medium having recorded thereon a set of computer-executable instructions for performing a navigation method, the set of instructions comprising at least an instruction for:

acquiring map information, current position information on a current position of a moving body, destination information on a location of a destination to which the moving body moves and traffic information on a traffic condition relating to the moving body;

recognizing an extent of trouble using the map information for the moving body to move on each of traveling routes searched on the basis of the current position information and the destination information on the basis of the traffic information; and increasing a number of traveling routes to be notified as a function of increase in the recognized extent of trouble.

38. A recording medium having recorded thereon a set of computer-executable instructions for performing a navigation method, the set of instructions comprising at least an instruction for:

acquiring map information, current position information on a current position of a moving body, destination information on a location of a destination to which the moving body moves and a traffic condition at a predetermined clock time of a predetermined date provided on the basis of statistic traffic information obtained by statistically processing a past traffic condition in terms of a temporal element;

recognizing an extent of trouble using the map information for the moving body to move on each of traveling routes searched on the basis of the current position information and the destination information on the basis of the traffic condition; and increasing a number of traveling routes to be notified as a function of increase in the recognized extent of trouble.

39. A recording medium having recorded thereon a set of computer-executable instructions for performing a navigation method, the set of instructions comprising at least an instruction for:

acquiring map information, current position information on a current position of a moving body and traffic information on a traffic condition relating to the moving body;

recognizing a trouble and an extent of trouble for the moving body to move on a traveling route on the basis of the traffic information; and searching a traveling route for avoiding an area with the trouble on the basis of the current position information, using the map information, so as to increase a number of traveling routes for avoiding the area with the trouble as a function of increase in the recognized extent of trouble.

40. A recording medium having recorded thereon a set of computer-executable instructions for performing a navigation method, the set of instructions comprising at least an instruction for:

acquiring map information, current position information on a current position of a moving body and a traffic condition at a predetermined clock time of a predetermined date provided on the basis of statistic traffic information obtained by statistically processing a past traffic condition in terms of a temporal element;

recognizing a trouble and an extent of trouble for the moving body to move on the basis of the traffic condition; and searching a traveling route for avoiding an area with the trouble on the basis of the current position information, using the map information, so as to increase a number of traveling routes for avoiding the area with the trouble as a function of increase in the recognized extent of trouble.

* * * * *